(12) United States Patent
Eun et al.

(10) Patent No.: US 12,045,472 B2
(45) Date of Patent: Jul. 23, 2024

(54) STORAGE DEVICE SUPPORTING MULTI-TENANT OPERATION AND METHODS OF OPERATING SAME

(71) Applicant: Samsung Electronics Co., Ltd., Suwon-si (KR)

(72) Inventors: Hee Seok Eun, Hwaseong-si (KR); Ji Soo Kim, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 17/744,918

(22) Filed: May 16, 2022

(65) Prior Publication Data
US 2023/0139519 A1     May 4, 2023

(30) Foreign Application Priority Data

Nov. 2, 2021   (KR) .................. 10-2021-0148649

(51) Int. Cl.
*G06F 3/06*     (2006.01)
*G06F 21/60*     (2013.01)
(Continued)

(52) U.S. Cl.
CPC .......... *G06F 3/0623* (2013.01); *G06F 3/0659* (2013.01); *G06F 3/0664* (2013.01); *G06F 3/0679* (2013.01); *G06F 21/602* (2013.01); *H03M 13/1151* (2013.01); *H03M 13/1575* (2013.01)

(58) Field of Classification Search
CPC ...... G06F 3/0614; G06F 3/0619; G06F 3/062; G06F 3/0622; G06F 3/0623; G06F 3/0656; G06F 3/0659; G06F 3/0662; G06F 3/0664; G06F 3/0679; G06F 12/0238; G06F 12/1408; G06F 21/602; G06F 21/064;
(Continued)

(56) References Cited

U.S. PATENT DOCUMENTS 8,656,189 B2   2/2014   Orsini et al.
9,223,612 B1 *   12/2015   Feldman ............... G06F 3/0652
(Continued)

FOREIGN PATENT DOCUMENTS

| KR | 20200071602 A | 6/2020 |
|---|---|---|
| KR | 20210033846 A * | 3/2021 |
| KR | 20210143611 A | 11/2021 |

OTHER PUBLICATIONS

European Office Action corresponding to European Application No. 22183263.7 (9 pages) (Jan. 13, 2023).
(Continued)

*Primary Examiner* — Ilwoo Park
(74) *Attorney, Agent, or Firm* — Myers Bigel, P.A.

(57) ABSTRACT

A storage device includes a storage controller, which is configured to receive a command generated by a first virtual machine, from a host, and a non-volatile memory device, which is configured to store first data for the command. The command includes one of a retain command, which is generated to command the storage controller to retain the first data in the non-volatile memory device, or an erase command, which is generated to command the storage controller to erase the first data from the non-volatile memory device, when access between the first virtual machine and the storage controller at least temporarily interrupted.

19 Claims, 17 Drawing Sheets

(51) Int. Cl.
*H03M 13/11* (2006.01)
*H03M 13/15* (2006.01)

(58) Field of Classification Search
CPC .. G06F 21/74; G06F 21/78; G06F 2212/1032; H03M 13/1151; H03M 13/1575
USPC ........... 710/5, 6, 74; 711/163; 713/160, 166, 713/167; 714/52, 746, 758
See application file for complete search history.

(56) References Cited

U.S. PATENT DOCUMENTS

| | | |
|---|---|---|
| 9,430,326 B2 | 8/2016 | Barndt |
| 10,009,376 B2 | 6/2018 | Antonakakis et al. |
| 10,776,525 B2 | 9/2020 | Gueron et al. |
| 2006/0005048 A1 | 1/2006 | Osaki et al. |
| 2009/0049204 A1* | 2/2009 | Boyd .................. G06F 9/45558 710/1 |
| 2012/0203986 A1 | 8/2012 | Strasser et al. |
| 2015/0033221 A1 | 1/2015 | Chari et al. |
| 2015/0379280 A1* | 12/2015 | Thota .................. G06F 21/6236 713/189 |
| 2020/0004311 A1* | 1/2020 | Olarig ..................... G06F 1/189 |
| 2020/0250325 A1 | 8/2020 | Chong et al. |
| 2020/0257815 A1 | 8/2020 | Huang et al. |
| 2021/0288943 A1 | 9/2021 | Green et al. |
| 2022/0095101 A1* | 3/2022 | Elumalai ................. H04W 4/14 |
| 2022/0221997 A1* | 7/2022 | Navon .................. G06F 3/0673 |

OTHER PUBLICATIONS

European Search Report corresponding to European Application No. 22183263.7 (4 pages) (Jan. 3, 2023).
"Summons to attend oral proceedings pursuant to Rule 115(1) EPC", EP Application No. 22183263.7, May 31, 2024, 12 pp.

* cited by examiner

STORAGE DEVICE SUPPORTING MULTI-TENANT OPERATION AND METHODS OF OPERATING SAME

REFERENCE TO PRIORITY APPLICATION

This application claims priority under 35 U.S.C. 119 to Korean Patent Application No. 10-2021-0148649, filed Nov. 2, 2021, the disclosure of which is hereby incorporated herein by reference.

BACKGROUND

1. Technical Field

The present disclosure relates to integrated circuit devices and, more particularly, to integrated circuit storage devices that support multi-tenancy and methods of operating the same.

2. Description of the Related Art

Recently, as semiconductor technology continues to develop, the performance of computer processors has significantly improved. And, as multi-core processor technology develops, the quantity of operations that may be performed simultaneously in one computer server has significantly increased.

Accordingly, Internet data centers have provided various and reliable services (e.g., a web server, a mail server, a file server, a video server, and cloud server) to different service users by installing hundreds or thousands of computer servers at one place.

However, as the number of tenants (e.g., virtual machines (VMs)) requesting a connection to the data center rapidly increases, the processing conditions for each of the tenants and/or the data of the tenants has diversified. Accordingly, the necessity for a storage device capable of satisfying the processing conditions for each of the tenants or each of the data of the tenants has emerged.

SUMMARY

Aspects of the present disclosure provide a storage device in which satisfaction for processing conditions for each of a plurality of tenants or each of data of the tenants is improved.

Aspects of the present disclosure also provide an operating method of a storage device in which satisfaction for processing conditions for each of the tenants or each of data of the tenants is improved.

According to an embodiment of the present inventive concept, there is provided a storage device including a storage controller configured to receive a command generated by a first virtual machine, from a host, and a non-volatile memory device configured to store first data for the command. The command may include one of a retain command for commanding the storage controller to retain the first data in the non-volatile memory device, or an erase command for commanding the storage controller to erase the first data from the non-volatile memory device, when access of the first virtual machine to the storage controller is interrupted or stopped.

According to another embodiment of the present inventive concept, there is provided a storage device including a storage controller configured to receive a command generated by a first virtual machine, from a host, a non-volatile memory device configured to store first data for the command, and an encryption/decryption engine configured to perform encryption and decryption operations on the first data and including a plurality of cryptography algorithms. In some of these embodiments, the command may include first encryption strength information for the first data. The encryption/decryption engine may also perform the encryption and decryption operations on the first data using at least one of the plurality of cryptography algorithms according to the first encryption strength information.

According to another embodiment of the present inventive concept, there is provided a storage device including a storage controller, which is configured to receive a command generated by a first virtual machine, from a host, a non-volatile memory device configured to store first data for the command, and an ECC engine configured to perform an error detection and correction function for the first data. The command may includes first reliability request type information for the first data. The ECC engine may determine an operation method of the ECC engine for the first data according to the first reliability request type information.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
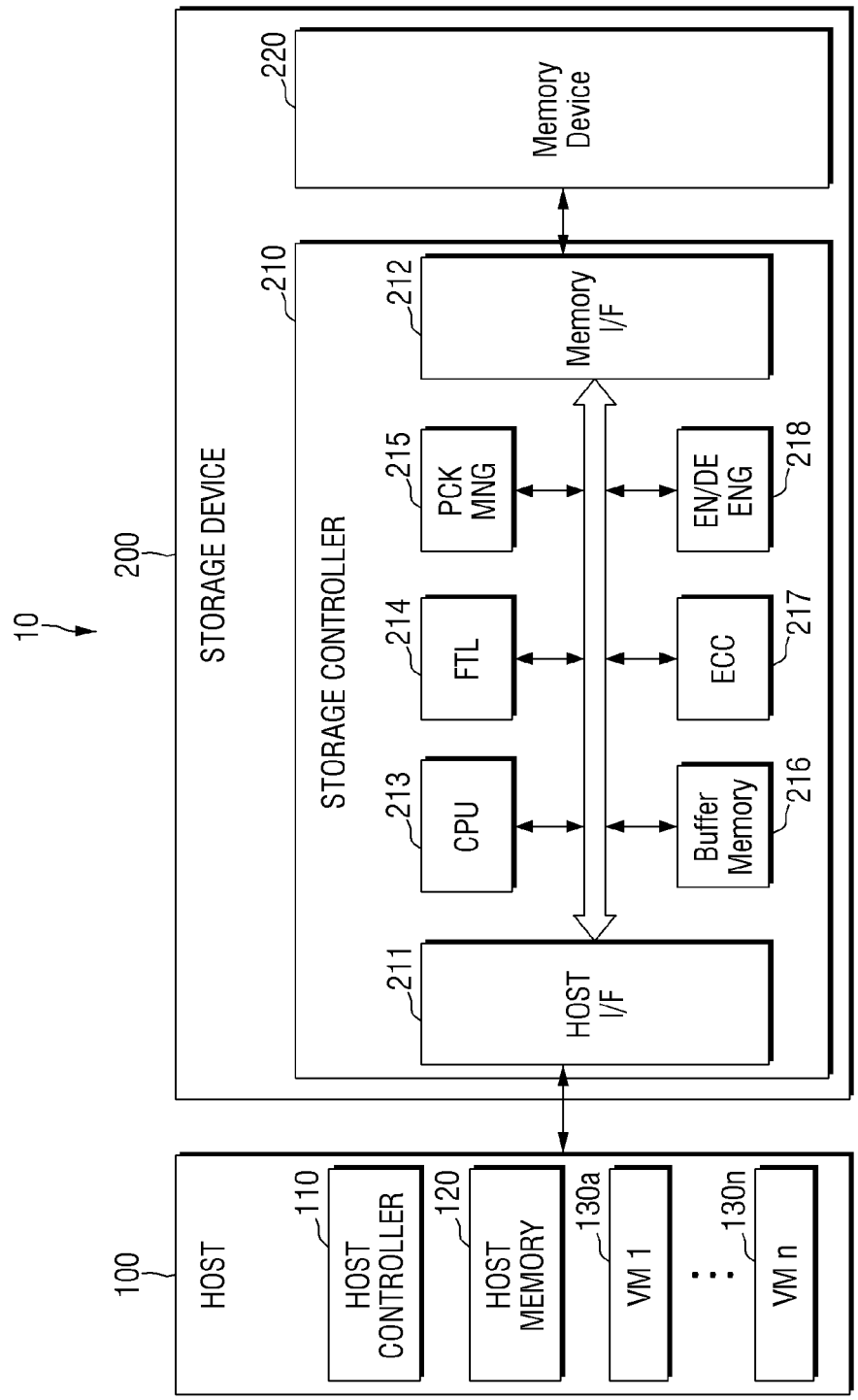
FIG. 1 is a block diagram illustrating a storage system in accordance with some exemplary embodiments.

FIG. 1 is a block diagram illustrating a storage system in accordance with some exemplary embodiments. A storage system 10 may include a host 100, and a storage device 200, which may include a storage controller 210 and a memory device 220. In addition, according to an exemplary embodiment of the present disclosure, the host 100 may include a host controller 110, a host memory 120, and a plurality of tenants (e.g., virtual machines (VMs), including VM 1 through VM n).

Single root I/O virtualization (SR-IOV) allows a plurality of virtual machines VM 1 to VM n in the host 100 to access the storage device through one assignable device interface (ADI). The single root I/O virtualization was published by the peripheral component interconnect special interest group (PCI-SIG).

The plurality of virtual machines (VM 1 to VM n) may maintain areas independent from each other, respectively, and may separately access the storage device 200; thus, the necessity for a storage device 200 that may satisfy processing conditions for each of the plurality of virtual machines VM 1 to VM n or each of data of the plurality of virtual machines VM 1 to VM n may emerge. An operation method of improving processing satisfaction for each of the plurality of virtual machines VM 1 to VM n or each of the data of the plurality of virtual machines VM 1 to VM n through the storage controller 210 in which the storage device 200 communicates with the host 100 will be described in detail below.

The host memory 120 may function as a buffer memory for temporarily storing data to be transmitted from each of the plurality of virtual machines VM 1 to VM n to the storage device 200 or data transmitted from the storage device 200. For example, a plurality of data for a command CMD generated by a first virtual machine VM 1 may be stored in the host memory 120. In addition, the plurality of data for the command CMD generated by the first virtual machine VM 1, which is stored in the host memory 120, may be transmitted to the storage device 200. In addition, data transmitted from the storage device 200 may be temporarily stored in the host memory 120. In addition, the data temporarily stored in the host memory 120 may be read and used by the first virtual machine VM 1, in some embodiments.

The storage device 200 may include storage media for storing data according to a request from the host 100. As an example, the storage device 200 may include at least one of a solid state drive (SSD), an embedded memory, and a removable external memory. When the storage device 200 is the SSD, the storage device 200 may be a device conforming to a non-volatile memory express (NVMe) standard. When the storage device 200 is an embedded memory or an external memory, the storage device 200 may be a device conforming to a universal flash storage (UFS) or embedded multi-media card (eMMC) standard. Each of the host 100 and the storage device 200 may generate and transmit a packet according to an adopted standard protocol.

When the memory device 220 of the storage device 200 includes a flash memory, the flash memory may include a 2D NAND memory array or a 3D (or vertical) NAND (VNAND) memory array. As another example, the storage device 200 may include various other types of non-volatile memories. For example, the storage device 200 may include a magnetic random access memory (MRAM), a spin-transfer torque MRAM, a conductive bridging RAM (CBRAM), a ferroelectric RAM (FeRAM), a phase RAM (PRAM), a resistive RAM, and various other types of memories.

According to an exemplary embodiment, the host controller 110 and the host memory 120 may be implemented as separate semiconductor chips. Alternatively, in some exemplary embodiments, the host controller 110 and the host memory 120 may be integrated on the same semiconductor chip. As an example, the host controller 110 may be any one of a plurality of modules included in an application processor, and the application processor may be implemented as a system on chip (SoC). In addition, the host memory 120 may be an embedded memory provided in the application processor or be a non-volatile memory or a memory module disposed outside the application processor.

The host controller 110 may manage an operation of storing data, such as write data of a buffer area of the host memory 120, in the memory device 220, or storing data, such as read data of the memory device 220, in the buffer area. For example, the host controller 110 may store the plurality of data for the command generated by the first virtual machine VM 1, stored in the buffer area, in the memory device 22. Alternatively, the host controller 110 may read the plurality of data for the command generated by the first virtual machine VM 1, stored in the memory device 220, and store the read data in the buffer area.

The storage controller 210 may include a host interface 211, a memory interface 212, and a central processing unit (CPU) 213. In addition, the storage controller 210 may further include a flash translation layer (FTL) 214, a packet manager 215, a buffer memory 216, an error correction code (ECC) engine 217, and an encryption/decryption engine 218. The storage controller 210 may further include a working memory (not illustrated) to which the flash translation layer (FTL) 214 is loaded; and data write and read operations for the memory device 220 may be controlled by the CPU 213 executing the flash translation layer FTL.

The host interface 211 may transmit and receive packets to and from the host 100. The packet transmitted from the host 100 to the host interface 211 may include a command CMD, data to be written to the memory device 220, or the like, and the packet transmitted from the host interface 211 to the host 100 may include a response to the command, data read from the memory device 220, or the like.

For example, the host interface 211 may receive the command transmitted from the first virtual machine VM 1 from the host 100. In addition, the host interface 211 may receive the plurality of data for the command transmitted from the first virtual machine VM 1 from the host 100. In addition, the plurality of data for the command generated by the first virtual machine VM 1, read from the memory device 220 may be transmitted from the host interface 211 to the host 100.

The memory interface 212 may transmit data to be written to the memory device 220 to the memory device 220, or may receive data read from the memory device 220. Such a memory interface 212 may be implemented to comply with a standard protocol such as a toggle or an Open NAND Flash Interface (ONFI).

The flash translation layer 214 may perform several functions such as: (i) address mapping, (ii) wear-leveling, and (iii) garbage collection. As will be understood by those skilled in the art, an address mapping operation is an operation of converting a logical address received from the host 100 into a physical address used to actually store data in the memory device 220. And, wear-leveling is a technology for preventing excessive deterioration of a specific block by allowing blocks in the memory device 220 to be uniformly used, and may be implemented through, for example, a firmware technology of balancing erase counts of physical blocks. The garbage collection is a technology for securing a usable capacity in the memory device 220 in a manner of copying valid data of a block to a new block and then erasing an existing block.

The packet manager 215 may generate a packet according to a protocol of an interface negotiated with the host 100 or parse various information from a packet received from the host 100. The packet manager 215 of the storage controller 210 according to some exemplary embodiments may receive a plurality of packets from each of the plurality of virtual machines VM 1 to VM n of the host 100, and parse various information from the received packets. A detailed description of the plurality of packets received by the packet manager 215 from each of the plurality of virtual machines VM 1 to VM n of the host 100 will be provided later.

The buffer memory 216 may temporarily store data to be written to the memory device 220 or data to be read from the memory device 220. The buffer memory 216 may be provided in the storage controller 210, but may also be disposed outside the storage controller 210.

The ECC engine 217 may perform an error detection and correction function for read data read from the memory device 220. More specifically, the ECC engine 217 may generate parity bits for write data to be written into the memory device 220, and the parity bits generated as described above may be stored in the memory device 220 together with the write data. At the time of reading data from the memory device 220, the ECC engine 217 may correct an error of read data using the parity bits read from the memory device 220 together with the read data, and output the read data of which the error is corrected.

The ECC engine 217 of the storage controller 210 according to some exemplary embodiments may determine an operation method of the ECC engine 217 based on reliability request type information related to each data for commands generated by each of the plurality of virtual machines VM 1 to VM n of the host 100. For example, the ECC engine 217 may differently/uniquely perform one ECC operation for data of the first virtual machine VM 1 and another ECC operation for data of the second virtual machine VM 2.

Alternatively, the ECC engine 217 of the storage controller 210 according to some exemplary embodiments may determine an operation method of the ECC engine 217 based on reliability request type information for each of a plurality of data for commands generated by, for example, the first virtual machine VM 1 of the plurality of virtual machines VM 1 to VM n of the host 100. For example, the ECC engine 217 may differently perform ECC operations for different first and second data of the plurality of data of the first virtual machine VM 1.

A detailed operation of the ECC engine 217 of the storage controller 210 according to some exemplary embodiments described above will be described later. The encryption/decryption engine 218 may perform at least one of an encryption operation and a decryption operation for data input to the storage controller 210.

For example, the encryption/decryption engine 218 may perform an encryption operation and/or a decryption operation using a symmetric-key algorithm. In this case, the encryption/decryption engine 218 may perform encryption and/or decryption operations using, for example, an advanced encryption standard (AES) algorithm or a data encryption standard (DES) algorithm.

In addition, for example, the encryption/decryption engine 218 may perform an encryption operation and/or a decryption operation using a public key cryptography algorithm. In this case, for example, the encryption/decryption engine 218 may perform encryption using a public key at the time of the encryption operation, and may perform decryption using a private key at the time of the decryption operation. For example, the encryption/decryption engine 218 may selectively use a Rivest-Shamir-Adleman (RSA) algorithm, elliptic curve cryptography (ECC), or Diffie-Hellman (DH) cryptography algorithm, as described more fully hereinbelow.

The present disclosure is not limited thereto, and the encryption/decryption engine 218 may perform an encryption operation and/or a decryption operation using a quantum cryptography technology such as homomorphic encryption (HE), post-quantum cryptography (PQC), or functional encryption (FE).

Advantageously, the encryption/decryption engine 218 of the storage controller 210 according to some exemplary embodiments may determine a cryptography algorithm to be applied to data based on encryption strength information related to each data for the commands generated by each of the plurality of virtual machines VM 1 to VM n of the host 100. For example, the encryption/decryption engine 218 may differently apply one cryptography algorithm for the data of the first virtual machine VM 1 and another distinct cryptography algorithm for the data of the second virtual machine VM 2.

Alternatively, the encryption/decryption engine 218 of the storage controller 210 according to some exemplary embodiments may determine a cryptography algorithm to be applied to data based on encryption strength information for each of the plurality of data for the commands generated by, for example, the first virtual machine VM 1 of the plurality of virtual machines VM 1 to VM n of the host 100. For example, the encryption/decryption engine 218 may even differently apply cryptography algorithms for different first and second data of the plurality of data of the first virtual machine VM 1. A detailed operation of the encryption/decryption engine 218 of the storage controller 210 according to some exemplary embodiments described above will be described hereinbelow.

Figure 2:
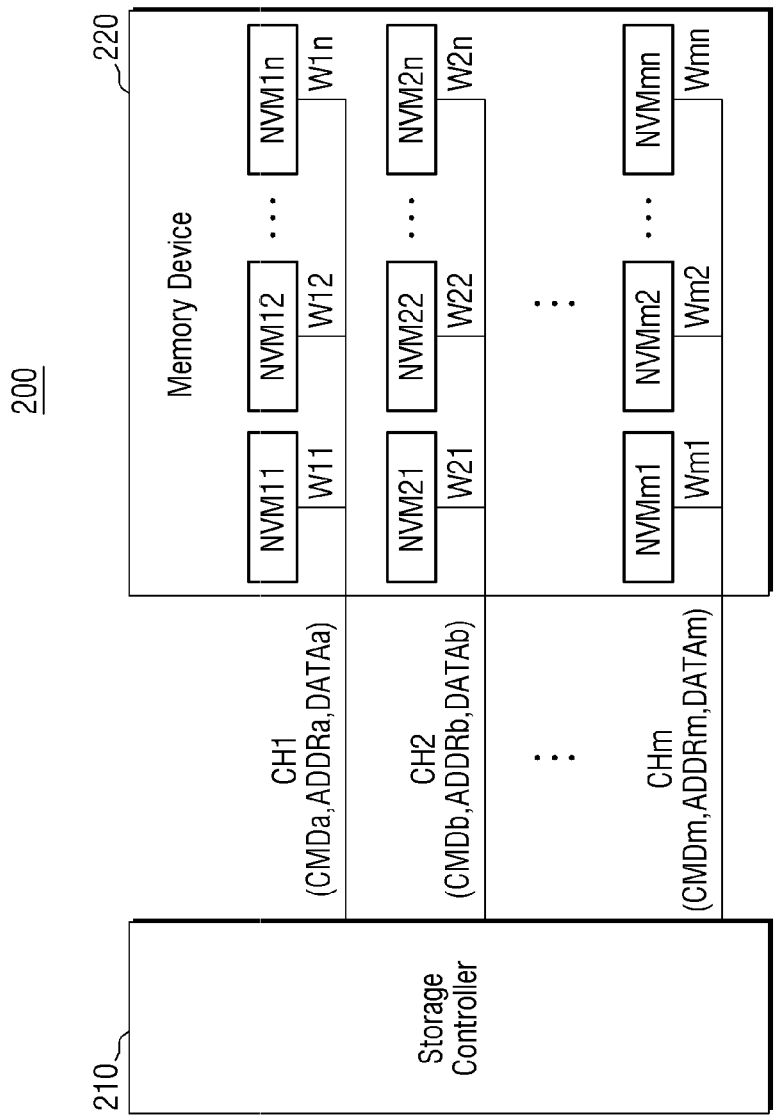
FIG. 2 is a block diagram illustrating reconfiguration of a storage controller and a memory device of a storage device of FIG. 1.

FIG. 2 is a block diagram illustrating reconfiguration of a storage controller and a memory device of a storage device of FIG. 1. Referring to FIG. 2, the storage device 200 may include a memory device 220 and a storage controller 210. The storage device 200 may support a plurality of channels CH1 to CHm, and the memory device 220 and the storage controller 210 may be connected to each other through the plurality of channels CH1 to CHm. For example, the storage device 200 may be implemented as a storage device such as a solid state drive (SSD).

The memory device 220 may include a plurality of non-volatile memory devices NVM11 to NVMmn. Each of the non-volatile memory devices NVM11 to NVMmn may be connected to one of the plurality of channels CH1 to CHm through a corresponding way (e.g., I/O port). For example, the non-volatile memory devices NVM11 to NVM1$n$ may be connected to a first channel CH1 through ways W11 to W1$n$, and the non-volatile memory devices NVM21 to NVM2$n$ may be connected to a second channel CH2 through ways W21 to W2$n$.

In an exemplary embodiment, each of the non-volatile memory devices NVM11 to NVMmn may be implemented in an arbitrary memory unit capable of operating according to an individual command from the storage controller 210. For example, each of the non-volatile memory devices NVM11 to NVMmn may be implemented as a chip or die, but the present disclosure is not limited thereto.

The storage controller 210 may transmit and receive signals to and from the memory device 220 through the plurality of channels CH1 to CHm. For example, the storage controller 210 may transmit commands CMDa to CMDm, addresses ADDRa to ADDRm, and data DATAa to DATAm to the memory device 220 or receive data DATAa to DATAm from the memory device 220, through the channels CH1 to CHm.

The storage controller 210 may select one of the non-volatile memory devices NVM11 to NVMmn connected to a corresponding channel through each channel, and transmit and receive signals to and from the selected non-volatile memory device. For example, the storage controller 210 may select the non-volatile memory device NVM11 of the non-volatile memory devices NVM11 to NVM1$n$ connected to the first channel CH1. The storage controller 210 may transmit a command CMDa, an address ADDRa, and data DATAa to the selected non-volatile memory device NVM11 or receive data DATAa from the selected non-volatile memory device NVM11, through the first channel CH1.

The storage controller 210 may transmit and receive signals to and from the memory device 220 in parallel through different channels. For example, the storage controller 210 may transmit a command CMDb to the memory device 220 through the second channel CH2 while transmitting the command CMDa to the memory device 220 through the first channel CH1. For example, the storage controller 210 may receive data DATAb from the memory device 220 through the second channel CH2 while receiving the data DATAa from the memory device 220 through the first channel CH1.

The storage controller 210 may control a general operation of the memory device 220. The storage controller 210 may control each of the non-volatile memory devices NVM11 to NVMmn connected to the channels CH1 to CHm by transmitting signals to the channels CH1 to CHm. For example, the storage controller 210 may control one non-volatile memory device selected among the non-volatile memory devices NVM11 to NVM1$n$ by transmitting the command CMDa and the address ADDRa to the first channel CH1.

Each of the non-volatile memory devices NVM11 to NVMmn may operate under the control of the storage controller 210. For example, the non-volatile memory device NVM11 may program the data DATAa according to the command CMDa and the address ADDRa provided to the first channel CH1. For example, the non-volatile memory device NVM21 may read the data DATAb according to the command CMDb and the address ADDRb provided to the second channel CH2, and transmit the read data DATAb to the storage controller 210.

It has been illustrated in FIG. 2 that the memory device 220 communicates with the storage controller 210 through m channels and the memory device 220 includes n non-volatile memory devices corresponding to each channel, but the number of channels and the number of non-volatile memory devices connected to one channel may be variously modified.

Next, referring to FIG. 2 together with FIG. 1, the storage controller 210 may transfer or receive data to and from the non-volatile memory through a separate channel or a separate way for each of the plurality of virtual machines VM 1 to VM n of the host 100 or each of the data of the plurality of virtual machines VM 1 to VM n. For example, the command CMDa generated by the first virtual machine VM 1 may be transmitted from the host 100 to the storage controller 210. In this case, the command CMDa, the address ADDRa for the command CMDa, and the data DATAa may be transmitted from the host 100 to the storage controller 210. The address ADDRa may include position information on a position at which the first virtual machine VM 1 intends to store the data DATAa in the memory device 220.

In addition, the command CMDb generated by the second virtual machine VM 2 is transmitted from the host 100 to the storage controller 210. In this case, the command CMDb, the address ADDRb for the command CMDb, and the data DATAb may be transmitted from the host 100 to the storage controller 210. The address ADDRb may include position information on a position at which the second virtual machine VM 2 intends to store the data DATAb in the memory device 220.

When an address of the non-volatile memory device NVM11 is stored so that the address ADDRa stores the data DATAa in the non-volatile memory device NVM11, the data DATAa may be stored in the non-volatile memory device NVM11 along the way W11. That is, all data related to the command CMDa generated by the first virtual machine VM 1 may be stored in the non-volatile memory device NVM11.

When the number of data DATAa related to the command CMDa generated by the first virtual machine VM 1 is plural (e.g., DATAa1 to DATAan), the address ADDRa may include position information of a non-volatile memory device in which each of the plurality of data (e.g., DATAa1 to DATAan) is to be stored.

For example, the data DATAa1 may be stored in the non-volatile memory device NVM11 along the way W11, the data DATAa2 may be stored in the non-volatile memory device NVM12 along the way W12, and the data DATAan may be stored in the non-volatile memory device NVM1$n$ along the way W1$n$.

The storage controller 210 according to some exemplary embodiments may store or read data in or from a required non-volatile memory device according to a required condition, for the data of each of the plurality of virtual machines VM 1 to VM n, according to the command generated by each of the plurality of virtual machines VM 1 to VM n in the host 100. Accordingly, satisfaction for requirements for the data of each of the plurality of virtual machines VM 1 to VM n may be improved. Hereinafter, for convenience of explanation, only the first virtual machine VM 1 will be described by way of example, and a description of the first virtual machine VM 1 may also be applied to the second virtual machine VM 2 to an n-th virtual machine VM n.

The command CMDa generated by the first virtual machine VM 1 according to some exemplary embodiments may include information for commanding whether to retain or erase the data of the first virtual machine VM 1 in or from the memory device 220 in preparation for a case where access of the first virtual machine VM 1 to the storage controller 210 is interrupted or stopped (e.g., log-off of the first virtual machine VM 1 for the storage device 200 or sudden power off (SPO) of the storage device 200 or the storage system 10).

As an example, in a case where access of the first virtual machine VM 1 to the storage controller 210 is interrupted or stopped, when the first virtual machine VM 1 desires that the data of the first virtual machine VM 1 will be retained in the memory device 220, the first virtual machine VM 1 may include a retain command in the command CMDa generated by the first virtual machine VM 1. In this case, the command CMDa may be an administration (i.e., admin) command. In more detail, the command CMDa may be a set feature command. Alternatively, the command CMDa is not limited thereto, and may also be an NVM command (including a write or read command).

The storage controller 210 detects a request type of the data of the first virtual machine VM 1. In this case, the storage controller 210 determines that the data DATAa of the first virtual machine VM 1 is to be treated as retain data when it detects that the retain command is included in the command CMDa generated by the first virtual machine VM 1. In this case, the storage controller 210 stores the data DATAa of the first virtual machine VM 1 in the memory device 220. Alternatively, when the data DATAa of the first virtual machine VM 1 is stored in the buffer memory 216, the storage controller 210 transmits the data DATAa to the memory device 220 and stores the data DATAa in the memory device 220. The above-described operation may also be performed on each of a plurality of data DATAa (e.g., DATAa1 to DATAan) of the first virtual machine VM 1 when it is assumed that the number of data DATAa of the first virtual machine VM 1 is plural (e.g., DATAa1 to DATAan).

As another example, in a case where access of the first virtual machine VM 1 to the storage controller 210 is stopped, when the first virtual machine VM 1 desires that the data of the first virtual machine VM 1 will be erased from the memory device 220, the first virtual machine VM 1 may include an erase command in the command CMDa generated by the first virtual machine VM 1. In this case, the command CMDa may be an admin command. In more detail, the command CMDa may be a set feature command. Alternatively, the command CMDa is limited thereto, and may also be an NVM command (including a write or read command).

The storage controller 210 detects a request type of the data of the first virtual machine VM 1. In this case, the storage controller 210 determines the data DATAa of the first virtual machine VM 1 as erase data when it detects that the erase command is included in the command CMDa generated by the first virtual machine VM 1. In this case, the storage controller 210 stores the data DATAa of the first virtual machine VM 1 in the buffer memory 216. Alternatively, when the data DATAa of the first virtual machine VM 1 is stored in the memory device 220, the storage controller 210 performs an erase operation to erase the data DATAa of the first virtual machine VM 1. The above-described operation may also be performed on each of a plurality of data DATAa (e.g., DATAa1 to DATAan) of the first virtual machine VM 1 when it is assumed that the number of data DATAa of the first virtual machine VM 1 is plural (e.g., DATAa1 to DATAan).

Figure 3:
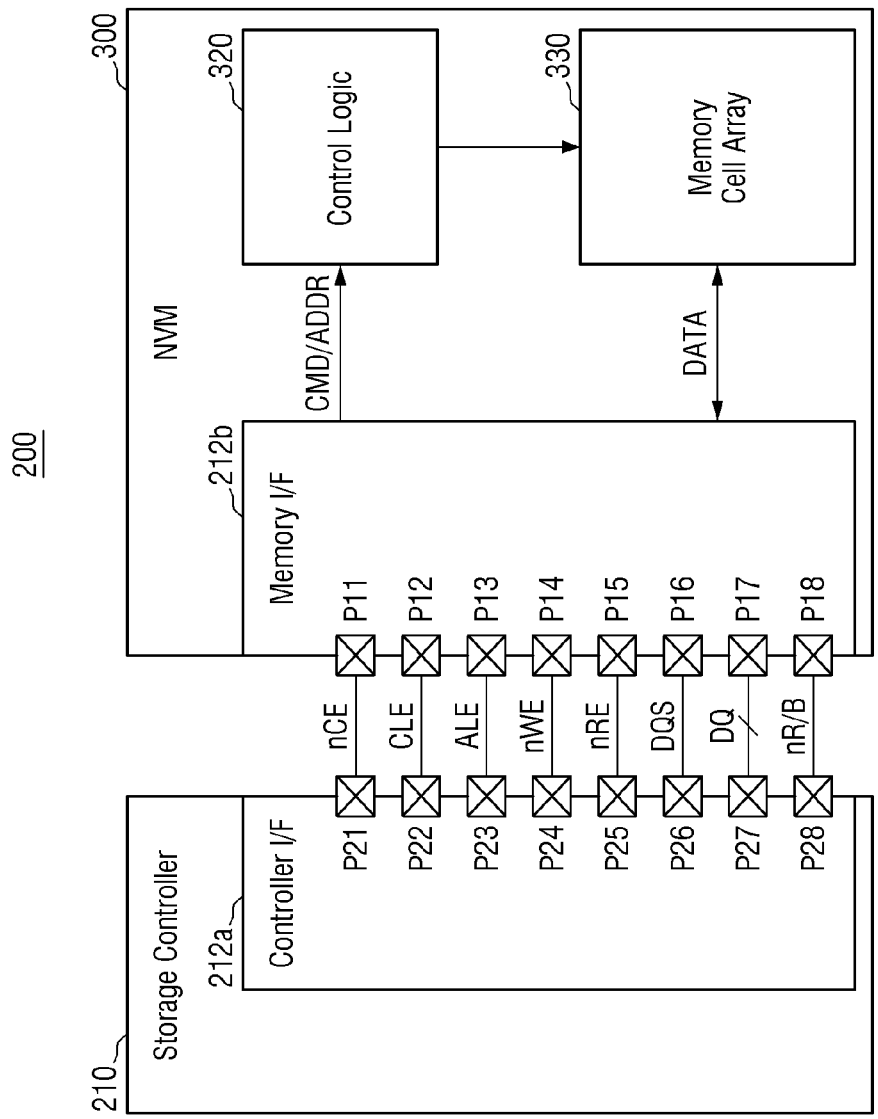
FIG. 3 is a block diagram illustrating reconfiguration of a storage controller, a memory interface, and a memory device of the storage device of FIG. 1.

FIG. 3 is a block diagram illustrating reconfiguration of a storage controller, a memory interface, and a memory device of the storage device of FIG. 1. Referring to FIG. 3, the storage device 200 may include a non-volatile memory device 300 and a storage controller 210. The non-volatile memory device 300 may correspond to one of the non-volatile memory devices NVM11 to NVMmn communicating with the storage controller 210 based on one of the plurality of channels CH1 to CHm of FIG. 2.

The non-volatile memory device 300 may include first to eighth pins P11 to P18, a memory interface circuit 212b, a control logic circuit 320, and a memory cell array 330. The memory interface 212 of FIG. 1 may include the memory interface circuit 212b of FIG. 3.

The memory interface circuit 212b may receive a chip enable signal nCE from the storage controller 210 through the first pin P11. The memory interface circuit 212b may transmit and receive signals to and from the storage controller 210 through the second to eighth pins P12 to P18 according to the chip enable signal nCE. For example, when the chip enable signal nCE is in an enable state (e.g., at a low level), the memory interface circuit 212b may transmit and receive signals to and from the storage controller 210 through the second to eighth pins P12 to P18.

The memory interface circuit 212b may receive a command latch enable signal CLE, an address latch enable signal ALE, and a write enable signal nWE from the storage controller 210 through the second to fourth pins P12 to P14. The memory interface circuit 212b may receive a data signal DQ from the storage controller 210 or transmit a data signal DQ to the storage controller 210, through the seventh pin P17. A command CMD, an address ADDR, and data may be transferred through the data signal DQ.

For example, the data signal DQ may be transferred through a plurality of data signal lines. In this case, the seventh pin P17 may include a plurality of pins corresponding to a plurality of data signals DQ. In this case, the command CMD, the address ADDR, and the data transmitted and received through the data signal DQ may be a command, an address, and data for each of the plurality of virtual machines VM 1 to VM n described with reference to FIG. 2.

The memory interface circuit 212b may obtain the command CMD from the data signal DQ received in an enable section (e.g., a high level state) of the command latch enable signal CLE based on toggle timings of the write enable signal nWE. The memory interface circuit 212b may obtain the address ADDR from the data signal DQ received in an enable section (e.g., a high level state) of the address latch enable signal ALE based on the toggle timings of the write enable signal nWE.

In an exemplary embodiment, the write enable signal nWE may be maintained in a static state (e.g., a high level or a low level), and then toggle between the high level and the low level. For example, the write enable signal nWE may toggle in a section in which the command CMD or the address ADDR is transmitted. Accordingly, the memory interface circuit 212b may obtain the command CMD or the address ADDR based on the toggle timings of the write enable signal nWE.

The memory interface circuit 212b may receive a read enable signal nRE from the storage controller 210 through the fifth pin P15. The memory interface circuit 212b may receive a data strobe signal DQS from the storage controller 210 or transmit a data strobe signal DQS to the storage controller 210, through the sixth pin P16.

In a data output operation of the non-volatile memory device 300, the memory interface circuit 212b may receive a toggling read enable signal nRE through the fifth pin P15 before outputting the data. The memory interface circuit 212b may generate a toggling data strobe signal DQS based on the toggling of the read enable signal nRE. For example, the memory interface circuit 212b may generate the data strobe signal DQS starting to toggle after a delay (e.g., tDQSRE) predefined on the basis of a toggling start time of the read enable signal nRE. The memory interface circuit 212b may transmit the data signal DQ including the data based on a toggle timing of the data strobe signal DQS.

Accordingly, the data may be aligned with the toggle timing of the data strobe signal DQS and transmitted to the storage controller 210.

In a data input operation of the non-volatile memory device 300, when the data signal DQ including the data is received from the storage controller 210, the memory interface circuit 212b may receive a toggling data strobe signal DQS together with the data from the storage controller 210. The memory interface circuit 212b may obtain the data from the data signal DQ based on a toggle timing of the data strobe signal DQS. For example, the memory interface circuit 212b may obtain the data by sampling the data signal DQ at a rising edge and a falling edge of the data strobe signal DQS.

The memory interface circuit 212b may transmit a ready/busy output signal nR/B to the storage controller 210 through the eighth pin P18. The memory interface circuit 212b may transmit state information of the non-volatile memory device 300 to the storage controller 210 through the ready/busy output signal nR/B. When the non-volatile memory device 300 is in a busy state (i.e., when internal operations of the non-volatile memory device 300 are being performed), the memory interface circuit 212b may transmit the ready/busy output signal nR/B indicating the busy state to the storage controller 210. When the non-volatile memory device 300 is in a ready state (i.e., when the internal operations of the non-volatile memory device 300 are not performed or have been completed), the memory interface circuit 212b may transmit the ready/busy output signal nR/B indicating the ready state to the storage controller 210. For example, while the non-volatile memory device 300 reads the data from the memory cell array 330 in response to a page read command, the memory interface circuit 212b may transmit the ready/busy output signal nR/B indicating the busy state (e.g., a low level) to the storage controller 210. For example, while the non-volatile memory device 300 programs the data in the memory cell array 330 in response to a program command, the memory interface circuit 212b may transmit the ready/busy output signal nR/B indicating the busy state to the storage controller 210.

The control logic circuit 320 may generally control various operations of the non-volatile memory device 300. The control logic circuit 320 may receive the obtained command/address CMD/ADDR from the memory interface circuit 212b. The control logic circuit 320 may generate control signals for controlling other components of the non-volatile memory device 300 according to the received command/address CMD/ADDR. For example, the control logic circuit 320 may generate various control signals for programming the data in the memory cell array 330 or reading the data from the memory cell array 330.

The memory cell array 330 may store the data obtained from the memory interface circuit 212b under the control of the control logic circuit 320. The memory cell array 330 may output the stored data to the memory interface circuit 212b under the control of the control logic circuit 320.

The memory cell array 330 may include a plurality of memory cells. For example, the plurality of memory cells may be flash memory cells. However, the present disclosure is not limited thereto, and the memory cells may be resistive random access memory (RRAM) cells, ferroelectric random access memory (FRAM) cells, phase change random access memory (PRAM) cells, thyristor random access memory (TRAM) cells, or magnetic random access memory (MRAM) cells. Hereinafter, exemplary embodiments of the present disclosure will be described with a focus on an exemplary embodiment in which the memory cells are NAND flash memory cells.

The storage controller 210 may include first to eighth pins P21 to P28 and a controller interface circuit 212a. The first to eighth pins P21 to P28 may correspond to the first to eighth pins P11 to P18 of the non-volatile memory device 300, respectively. And, the memory interface 212 of FIG. 1 may include the controller interface circuit 212a of FIG. 3.

The controller interface circuit 212a may transmit the chip enable signal nCE to the non-volatile memory device 300 through the first pin P21. The controller interface circuit 212a may transmit and receive signals to and from the non-volatile memory device 300 selected through the chip enable signal nCE through the second to eighth pins P22 to P28.

The controller interface circuit 212a may transmit the command latch enable signal CLE, the address latch enable signal ALE, and the write enable signal nWE to the non-volatile memory device 300 through the second to fourth pins P22 to P24. The controller interface circuit 212a may transmit the data signal DQ to the non-volatile memory device 300 or receive the data signal DQ from the non-volatile memory device 300, through the seventh pin P27.

The controller interface circuit 212a may transmit the data signal DQ including the command CMD or the address ADDR together with the toggling write enable signal nWE to the non-volatile memory device 300. The controller interface circuit 212a may transmit the data signal DQ including the command CMD to the non-volatile memory device 300 as it transmits the command latch enable signal CLE having an enable state, and may transmit the data signal DQ including the address ADDR to the non-volatile memory device 300 as it transmits the address latch enable signal ALE having an enable state.

The controller interface circuit 212a may transmit the read enable signal nRE to the non-volatile memory device 300 through the fifth pin P25. The controller interface circuit 212a may receive the data strobe signal DQS from the non-volatile memory device 300 or transmit the data strobe signal DQS to the non-volatile memory device 300, through the sixth pin P26.

In the data output operation of the non-volatile memory device 300, the controller interface circuit 212a may generate the toggling read enable signal nRE and transmit the read enable signal nRE to the non-volatile memory device 300. For example, the controller interface circuit 212a may generate the read enable signal nRE changed from a static state (e.g., a high level or a low level) to a toggle state before the data is output. Accordingly, the toggling data strobe signal DQS may be generated based on the read enable signal nRE in the non-volatile memory device 300. The controller interface circuit 212a may receive the data signal DQ including the data together with the toggling data strobe signal DQS from the non-volatile memory device 300. The controller interface circuit 212a may obtain the data from the data signal DQ based on the toggle timing of the data strobe signal DQS.

In the data input operation of the non-volatile memory device 300, the controller interface circuit 212a may generate the toggling data strobe signal DQS. For example, the controller interface circuit 212a may generate the data strobe signal DQS changed from a static state (e.g., a high level or a low level) to a toggle state before transmitting the data. The controller interface circuit 212a may transmit the data signal DQ including the data to the non-volatile memory device 300 based on the toggle timings of the data strobe signal DQS.

The controller interface circuit 212a may receive the ready/busy output signal nR/B from the non-volatile memory device 300 through the eighth pin P28. The controller interface circuit 212a may decide the state information of the non-volatile memory device 300 based on the ready/busy output signal nR/B.

Figure 4:
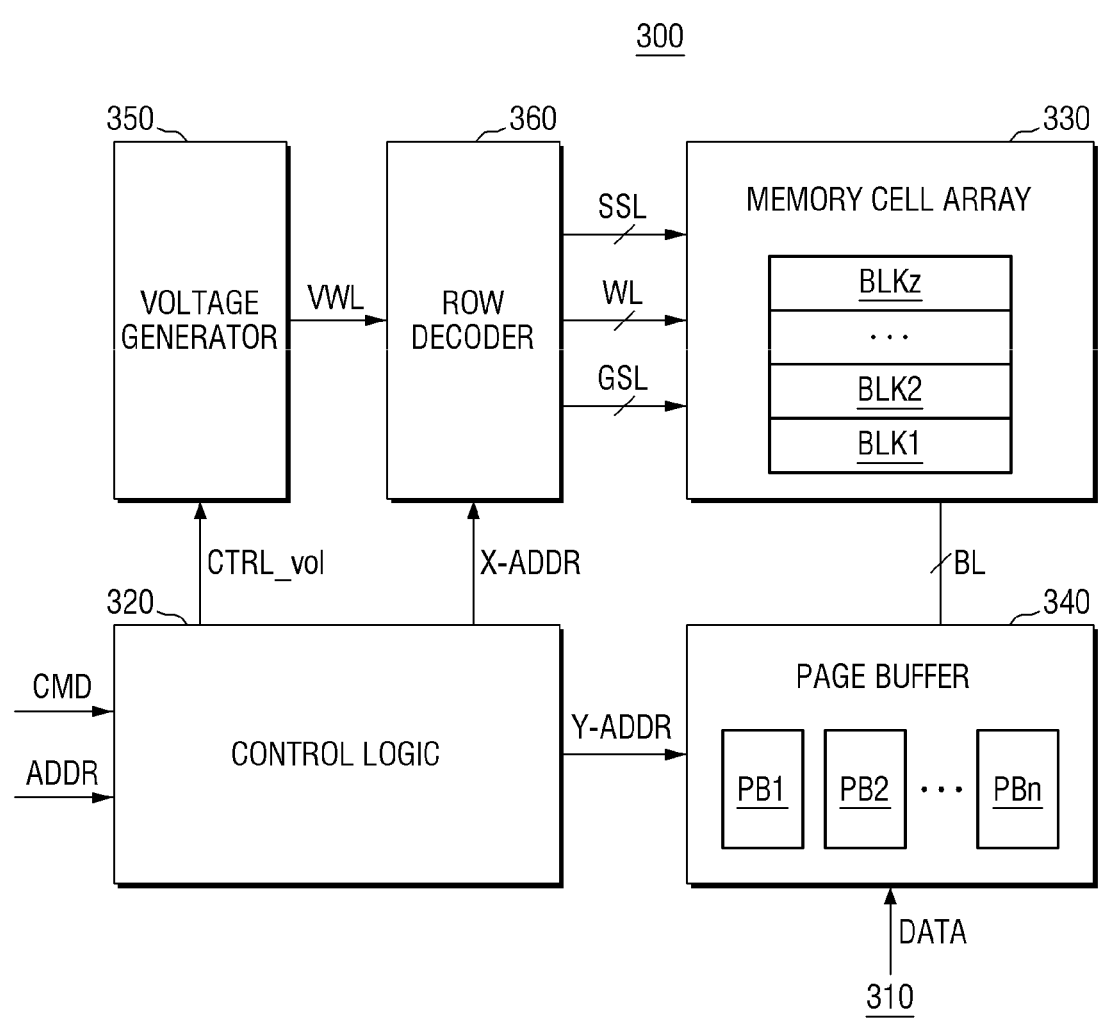
FIG. 4 is an illustrative block diagram illustrating a non-volatile memory device of FIG. 2.

FIG. 4 is an illustrative block diagram illustrating a non-volatile memory device of FIG. 2. Referring to FIG. 4, the non-volatile memory device 300 may include a control logic circuit 320, a memory cell array 330, a page buffer 340, a voltage generator 350, and a row decoder 360. Although not illustrated in FIG. 4, the non-volatile memory device 300 may further include the memory interface circuit 212b illustrated in FIG. 3, and may further include column logic, a pre-decoder, a temperature sensor, a command decoder, an address decoder, and the like.

The control logic circuit 320 may generally control various operations within the non-volatile memory device 300. The control logic circuit 320 may output various control signals in response to a command CMD and/or an address ADDR from the memory interface circuit 310. For example, the control logic circuit 320 may output a voltage control signal CTRL_vol, a row address X-ADDR, and a column address Y-ADDR.

In this case, the command CMD and/or the address ADDR may be a command and/or an address for each of the plurality of virtual machines VM 1 to VM n described with reference to FIG. 2.

The memory cell array 330 may include a plurality of memory blocks BLK1 to BLKz (z is a positive integer), each of which may include a plurality of memory cells. The memory cell array 330 may be connected to the page buffer 340 through bit lines BL, and may be connected to the row decoder 360 through word lines WL, string selection lines SSL, and ground selection lines GSL.

In an exemplary embodiment, the memory cell array 330 may include a three-dimensional (3D) memory cell array, and the 3D memory cell array may include a plurality of NAND strings. Each NAND string may include memory cells connected to word lines and vertically stacked on a substrate, as described in: U.S. Pat. Nos. 7,679,133, 8,553, 466, 8,654,587, 8,559,235, and U.S. Patent Application Publication No. 2011/0233648, which are hereby incorporated herein by reference. In an exemplary embodiment, the memory cell array 330 may include a two-dimensional (2D) memory cell array, and the 2D memory cell array may include a plurality of NAND strings arranged along row and column directions.

The page buffer 340 may include a plurality of page buffers PB1 to PBn (n is an integer of 3 or more), and the plurality of page buffers PB1 to PBn may be connected, respectively, to the memory cells through a plurality of bit lines BL. The page buffer 340 may select at least one of the bit lines BL in response to the column address Y-ADDR. The page buffer 340 may operate as a write driver or a sense amplifier according to an operation mode. For example, at the time of a program operation, the page buffer 340 may apply a bit line voltage corresponding to data to be programmed to the selected bit line. At the time of a read operation, the page buffer 340 may detect a current or a voltage of the selected bit line to detect data stored in the memory cell.

The voltage generator 350 may generate various types of voltages for performing program, read, and erase operations based on the voltage control signal CTRL_vol. For example, the voltage generator 350 may generate a program voltage, a read voltage, a program verification voltage, an erase voltage, and the like, as word line voltages VWL.

The row decoder 360 may select one of a plurality of word lines WL and may select one of a plurality of string selection lines SSL, in response to the row address X-ADDR. For example, the row decoder 360 may apply the program voltage and the program verification voltage to the selected word line at the time of the program operation, and may apply the read voltage to the selected word line at the time of the read operation.

Figure 5:
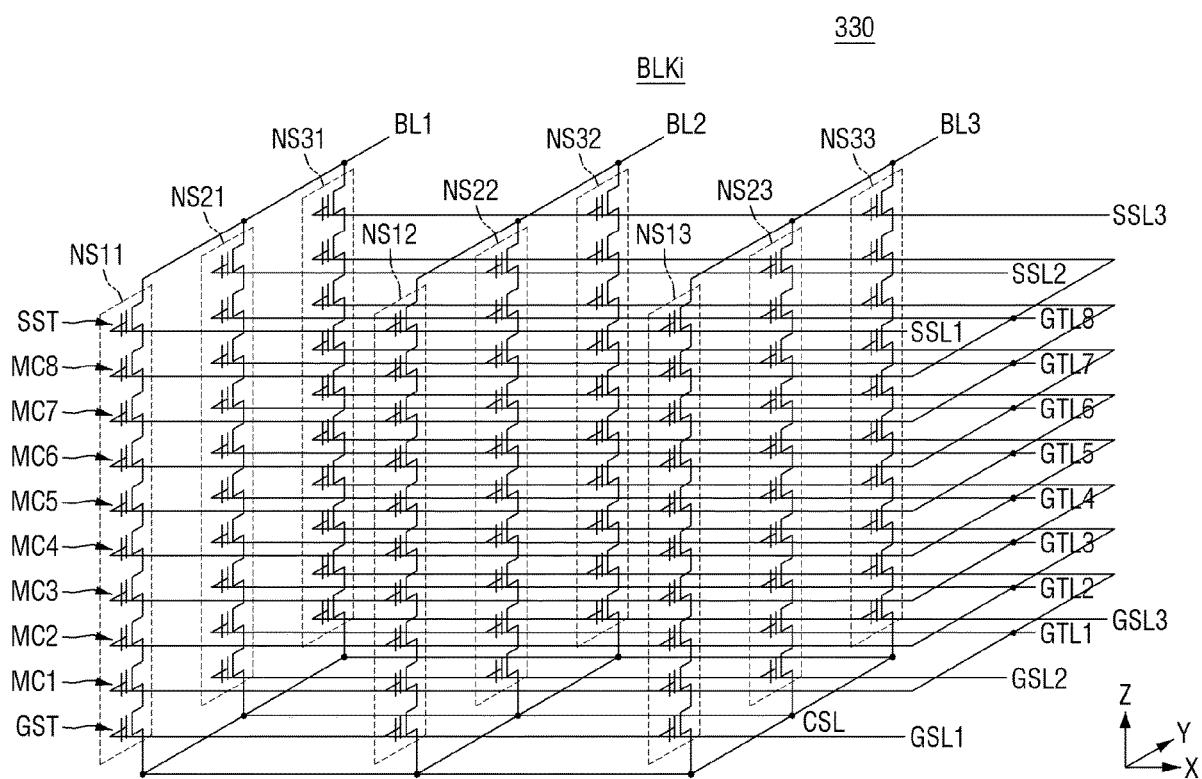
FIG. 5 is a diagram for describing a 3D V-NAND structure that may be applied to a non-volatile memory device according to some exemplary embodiments.

FIG. 5 is a diagram for describing a 3D V-NAND structure that may be applied to a non-volatile memory device according to some exemplary embodiments. For example, in a case where the storage device of FIG. 1 according to some exemplary embodiments is applied as a storage module of a UFS device, when the storage module of the UFS device is implemented as a 3D V-NAND-type flash memory, each of a plurality of memory blocks constituting the storage module may be represented by an equivalent circuit as illustrated in FIG. 5.

Referring to FIG. 5, a memory block BLKi of a non-volatile memory device 330 is a three-dimensional memory block formed in a three-dimensional structure on a substrate. For example, a plurality of memory NAND strings included in the memory block BLKi may be formed in a direction perpendicular to the substrate.

The memory block BLKi may include a plurality of memory NAND strings NS11 to NS33 connected between bit lines BL1, BL2, and BL3 and a common source line CSL. Each of the plurality of memory NAND strings NS11 to NS33 may include a string selection transistor SST, a plurality of memory cells MC1, MC2, . . . , MC8, and a ground selection transistor GST. It has been illustrated in FIG. 5 that each of the plurality of memory NAND strings NS11 to NS33 includes eight memory cells MC1, MC2, . . . , MC8, but the present disclosure is not necessarily limited thereto.

The string selection transistors SST may be connected to corresponding string selection lines SSL1, SSL2, and SSL3. The plurality of memory cells MC1, MC2, . . . MC8 may be connected to corresponding gate lines GTL1, GTL2, . . . , GTL8, respectively. The gate lines GTL1, GTL2, . . . , GTL8 may correspond to word lines, and some of the gate lines GTL1, GTL2, . . . , GTL8 may correspond to dummy word lines. The ground selection transistors GST may be connected to corresponding ground selection lines GSL1, GSL2, and GSL3. The string selection transistors SST may be connected to corresponding bit lines BL1, BL2, and BL3, and the ground selection transistors GST may be connected to the common source line CSL.

Word lines (for example, WL1) having the same height may be connected in common, and the ground selection lines GSL1, GSL2, and GSL3 and the string selection lines SSL1, SSL2, and SSL3 may be separated from each other, respectively. It has been illustrated in FIG. 5 that the memory block BLKi is connected to eight gate lines GTL1, GTL2, . . . , GTL8 and three bit lines BL1, BL2, and BL3, but the present disclosure is not necessarily limited thereto.

Figure 6:
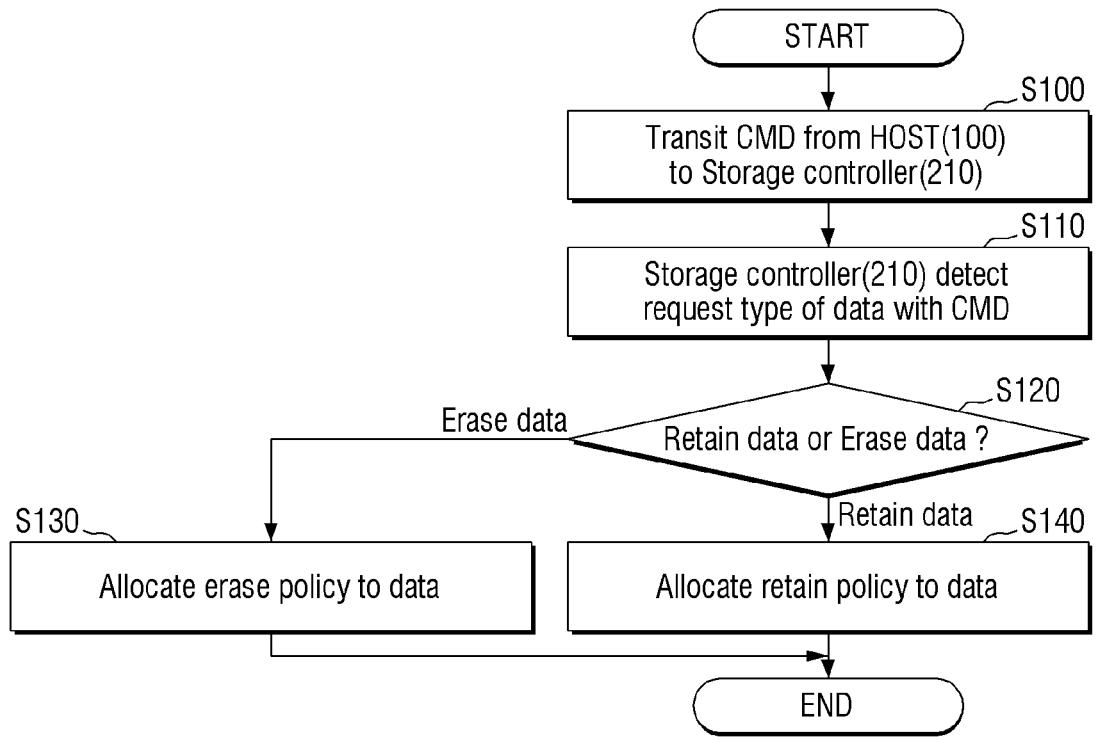
FIG. 6 is a flowchart illustrating an operating method of a storage device according to some exemplary embodiments.

FIG. 6 is a flowchart illustrating an operating method of a storage device according to some exemplary embodiments. Hereinafter, a description of portions overlapping those described above with reference to FIG. 2 will be omitted or simplified.

Referring to FIGS. 1, 2, and 6, the command CMD generated by the first virtual machine VM 1 is transmitted from the host 100 to the storage controller 210 (S100). In this case, the command CMD generated by the first virtual machine VM 1 may include information for commanding whether to retain or erase the data of the first virtual machine VM 1 in or from the memory device 220 in preparation for a case where access of the first virtual machine VM 1 to the storage controller 210 is interrupted or stopped (e.g., log-off of the first virtual machine VM 1 for the storage device 200 or sudden power off (SPO) of the storage device 200 or the storage system 10).

The storage controller 210 detects a request type of the data of the first virtual machine VM 1 through the received command CMD (S110). In addition, the storage controller 210 determines whether the data of the first virtual machine VM 1 is retain data or erase data, through information included in the command CMD (S120). For example, when the command CMD generated by the first virtual machine VM 1 is an admin CMD, information may be included in a set feature. Alternatively, for example, when the command CMD generated by the first virtual machine VM 1 is an NVM command set including read and/or write commands for the memory device 220, setting information on whether the data of the first virtual machine VM 1 is the retain data or the erase data may be set using a flag.

When it is determined that the data of the first virtual machine VM 1 corresponds to the erase data, in a case where the access of the first virtual machine VM 1 to the storage controller 210 is stopped (e.g., the log-off of the first virtual machine VM 1 for the storage device 200 or the sudden power off (SPO) of the storage device 200 or the storage system 10), the storage controller 210 may allocate an erase policy to the data so that the data of the first virtual machine VM1 is erased from the storage device 200 (S130).

For example, when data of the first virtual machine VM 1 to which the erase policy is allocated is stored in the memory device 220, in the case where the access of the first virtual machine VM 1 to the storage controller 210 is stopped (e.g., the log-off of the first virtual machine VM 1 for the storage device 200 or the sudden power off (SPO) of the storage device 200 or the storage system 10), the data may be erased. The data is not limited to being stored in the memory device 220, and may also be stored in another component (e.g., the buffer 216). Otherwise, when it is determined that the data of the first virtual machine VM 1 corresponds to the retain data, in the case where the access of the first virtual machine VM 1 to the storage controller 210 is interrupted or stopped (e.g., the log-off of the first virtual machine VM 1 for the storage device 200 or the sudden power off (SPO) of the storage device 200 or the storage system 10), the storage controller 210 may allocate a retain policy to the data so that the data of the first virtual machine VM1 is retained from the storage device 200 (S140).

For example, when data of the first virtual machine VM 1 to which the retain policy is allocated is stored in the memory device 220, in the case where the access of the first virtual machine VM 1 to the storage controller 210 is stopped (e.g., the log-off of the first virtual machine VM 1 for the storage device 200 or the sudden power off (SPO) of the storage device 200 or the storage system 10), the data may be retained. The data is not limited to being stored in the memory device 220, and may also be stored in another component (e.g., the buffer 216). In the case where the access of the first virtual machine VM 1 to the storage controller 210 is stopped (e.g., the log-off of the first virtual machine VM 1 for the storage device 200 or the sudden power off (SPO) of the storage device 200 or the storage system 10) in a state in which the data is stored in the buffer 216, the data of the buffer 216 may be stored and retained in the non-volatile memory device 300.

Figure 7:
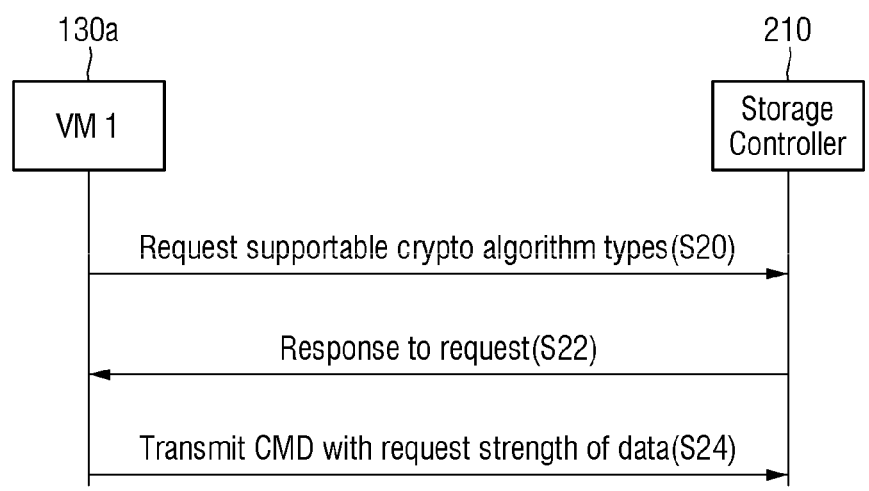
FIG. 7 is a ladder diagram illustrating an operating method of a storage system according to some exemplary embodiments.

FIG. 7 is a ladder diagram illustrating an operating method of a storage system according to some exemplary embodiments. FIGS. 1 and 7 illustrate an example of a protocol through transmission/reception of packets between the first virtual machine VM 1 of the host 100 and the storage controller 210. In more detail, packets between the first virtual machine VM 1 of the host 100 and the storage controller 210 may be managed through the packet manager 215.

The first virtual machine VM 1 may request cryptography algorithm information supportable by the storage device 200 from the storage controller 210 (S20). In more detail, the encryption/decryption engine 218 of the storage device 200 may request supportable cryptography algorithm information from the storage controller 210. In response to such a request, the storage controller 210 transmits the cryptography algorithm information supportable by the storage device 200 to the first virtual machine VM 1 (S22). For example, the storage controller 210 may transmit a response indicating that the encryption/decryption engine 218 of the storage device 200 may support Rivest-Shamir-Adleman (RSA) algorithm, elliptic curve cryptography (ECC), and post quantum cryptography (PQC) cryptography algorithms to the first virtual machine VM 1. Cryptography algorithms that the encryption/decryption engine 218 may support, indicated by the response are not limited thereto.

The first virtual machine VM 1 determines an encryption strength according to a cryptography algorithm required for the data of the first virtual machine VM 1 based on the response received from the storage controller 210, includes encryption strength information on the determined encryption strength in the command CMD, and transmits the command CMD with the encryption strength information to the storage controller 210 (S24).

Figure 8:
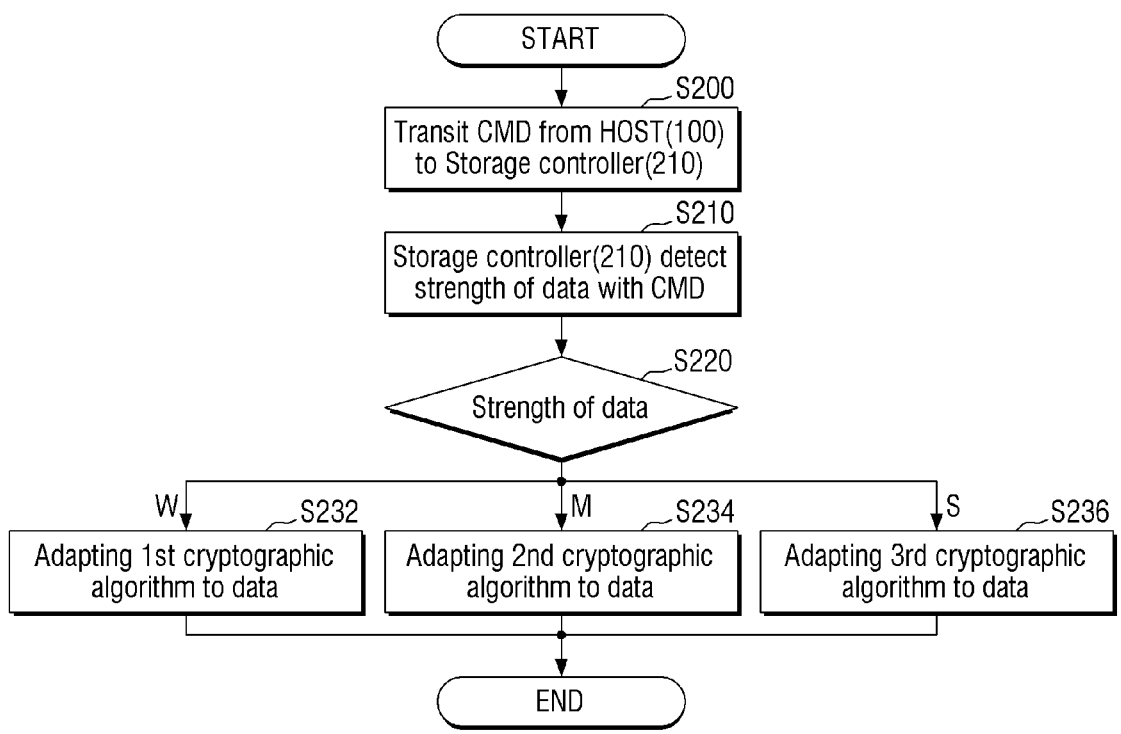
FIG. 8 is a flowchart illustrating another operating method of a storage device according to some exemplary embodiments.

FIG. 8 is a flowchart illustrating another operating method of a storage device according to some exemplary embodiments. Referring to FIGS. 1 and 8, the command CMD generated by the first virtual machine VM 1 is transmitted from the host 100 to the storage controller 210 (S200). In this case, the command CMD generated by the first virtual machine VM 1 may include encryption strength information on the data of the first virtual machine VM 1.

The storage controller 210 detects a type of encryption strength of the data indicating which encryption strength the first virtual machine VM 1 requests for the data of the first virtual machine VM 1, through the received command CMD (S210). Next, the storage controller 210 determines whether the first virtual machine VM 1 desires a weak encryption strength (W: Weak), desires a medium encryption strength (M: Medium), or desires a strong encryption strength (S: Strong), for the data of the first virtual machine VM 1, based on the encryption strength information included in the command CMD (S220). In this case, the number of types of the encryption strength divided by the first virtual machine VM 1 is not limited thereto. For example, the encryption strength may also be divided into five types such as a weak strength, a slightly weak strength, a medium strength, a slightly strong strength, and a strong strength. The encryption strength may be divided through types of the cryptography algorithms that may be provided by the encryption/decryption engine 218, and thus, is not limited to those in FIG. 8 and a description of FIG. 8.

In a case where the encryption strength information included in the command CMD received from the first virtual machine VM 1 indicates the Weak (W) level, the storage controller 210 may perform encryption and decryption operations on the data of the first virtual machine VM 1 using a first cryptography algorithm (S232). The first cryptography algorithm may be, for example, the Rivest Shamir Adleman (RSA) algorithm. In contrast, in the event the encryption strength information included in the command CMD received from the first virtual machine VM 1 indicates the Medium (M) level, the storage controller 210 may perform encryption and decryption operations on the data of the first virtual machine VM 1 using a second cryptography algorithm (S234). The second cryptography algorithm may be, for example, the elliptic curve cryptography (ECC) algorithm.

In a case where the encryption strength information included in the command CMD received from the first virtual machine VM 1 indicates the Strong (S) level, the storage controller 210 may perform encryption and decryption operations on the data of the first virtual machine VM 1 using a third cryptography algorithm (S236). The third cryptography algorithm may be, for example, the post quantum cryptography (PQC) algorithm.

It has been described above by way of example that different cryptography algorithms are applied in different cases to all data of the first virtual machine VM 1, but different encryption strength information may be written into each of the plurality of data of the first virtual machine VM 1, such that different cryptography algorithms may be applied to each of the plurality of data of the first virtual machine VM 1.

Figure 9:
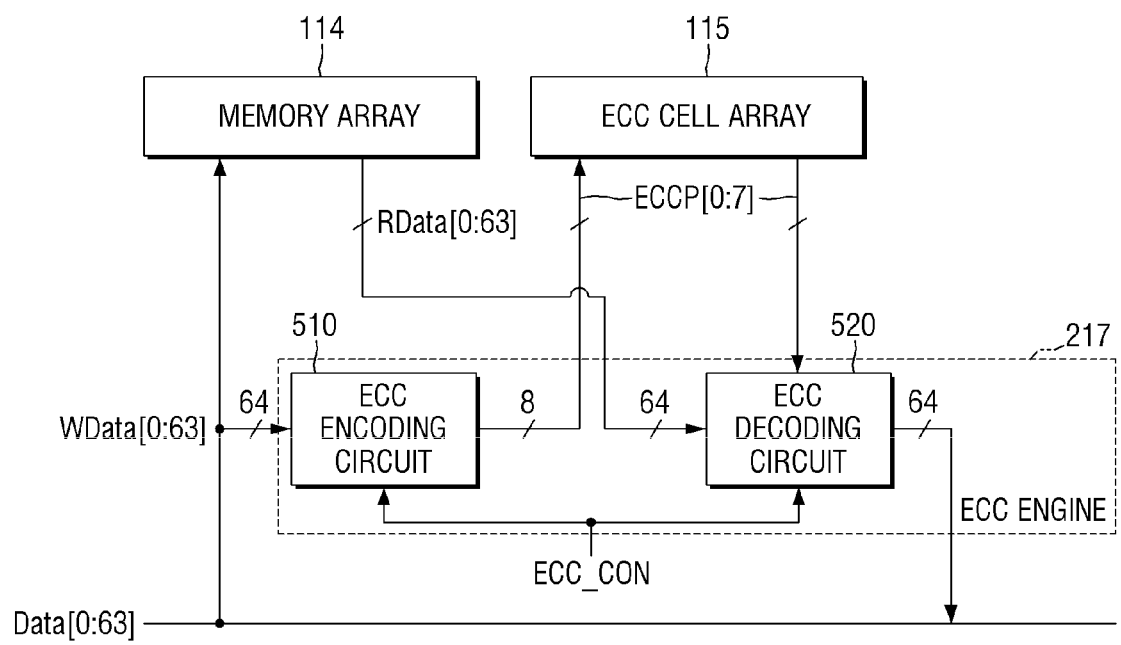
FIG. 9 is a block diagram for describing an ECC engine within FIG. 1 in detail.
Figure 10:
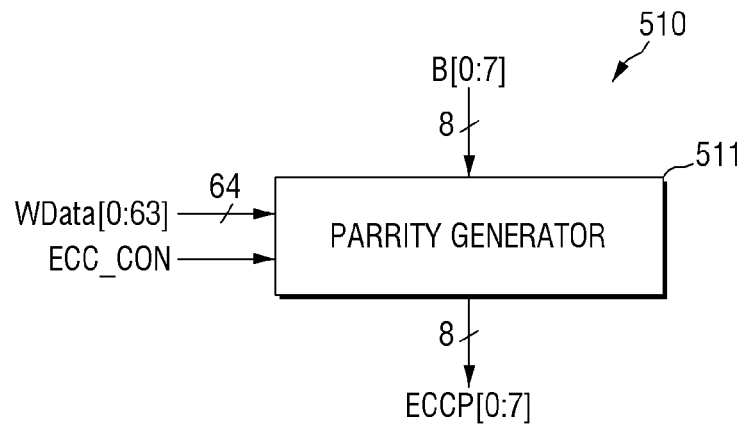
FIG. 10 is a block diagram for describing an ECC encoding circuit within FIG. 9.

FIG. 9 is a block diagram for describing an ECC engine 217 of FIG. 1 in detail. FIG. 10 is a block diagram for describing an ECC encoding circuit 510 of FIG. 9. Referring to FIGS. 9 and 10, the ECC engine 217 may include an ECC encoding circuit 510 and an ECC decoding circuit 520. The ECC encoding circuit 510 may generate parity bits ECCP[0:7] for write data WData[0:63] to be written into memory cells of a memory cell array 330 in response to an ECC control signal ECC_CON. The parity bits ECCP[0:7] may be stored in an ECC cell array 223. According to exemplary embodiments, the ECC encoding circuit 510 may generate parity bits ECCP[0:7] for write data WData[0:63] to be written into memory cells including defective cells of the memory cell array 330 in response to the ECC control signal ECC_CON.

The ECC decoding circuit 520 may correct error bit data using read data RData[0:63] read from the memory cells of the memory cell array 330 and the parity bits ECCP[0:7] read from the ECC cell array 223 in response to the ECC control signal ECC_CON, and output data Data[0:63] of which an error is corrected. According to exemplary embodiments, the ECC decoding circuit 520 may correct error bit data using read data RData[0:63] read from the memory cells including the defective cells of the memory cell array 330 and the parity bits ECCP[0:7] read from the ECC cell array 223 in response to the ECC control signal ECC_CON, and output data Data[0:63] of which an error is corrected.

The ECC encoding circuit 510 may include a parity generator 511 receiving 64-bit write data WData[0:63] and basis bits B[0:7]) in response to the ECC control signal ECC_CON and generating the parity bits ECCP[0:7] using an XOR array operation. The basis bits B[0:7] are bits for generating the parity bits ECCP[0:7] for the 64-bit write data WData[0:63], and may be, for example, b'00000000 bits. The basis bits (B[0:7]) may be other specific bits instead of the b'00000000 bits.

Referring to FIGS. 1, 9, and 10, the first virtual machine VM 1 may transmit a command CMD including reliability request type information including information on a reliability level requested for the data of the first virtual machine VM 1 to the storage controller 210. In addition, the ECC engine 217 may determine an operation method of the ECC engine 217 for the data according to the reliability request type information requested by the first virtual machine VM 1, based on the received command CMD.

Figure 11:
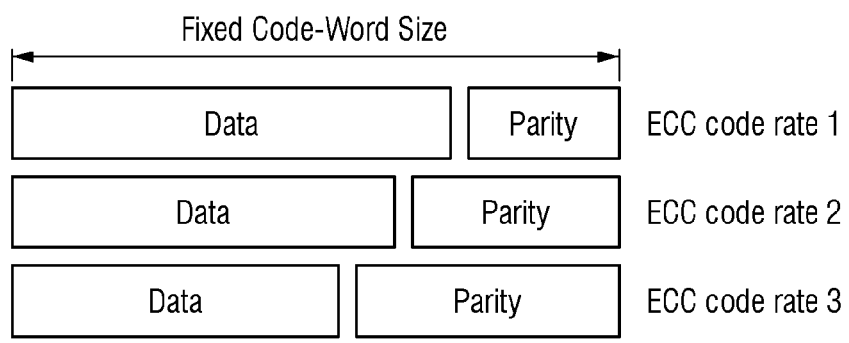
FIGS. 11 and 12 are illustrative views for describing an operation method of the ECC engine of FIG. 1.
Figure 12:
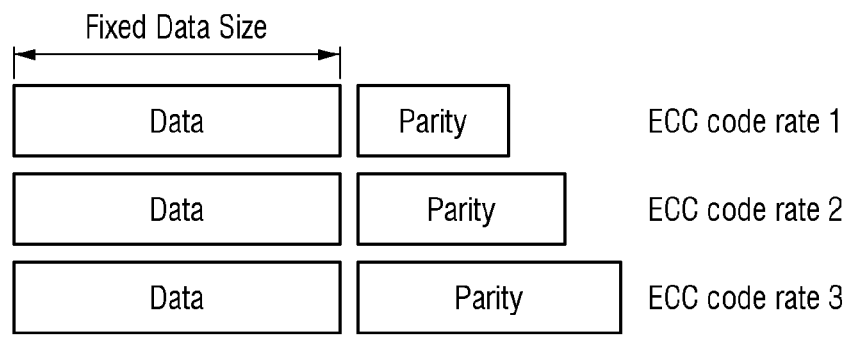

FIGS. 11 and 12 are illustrative views for describing an operation method of the ECC engine 217 of FIG. 1. Referring to FIGS. 9 to 12, for example, the ECC engine 217 may adjust the number of parity bits generated through the parity generator 511 according to the reliability request type information.

As an example, in FIG. 11, assuming that a code-word size exchanged between the first virtual machine VM 1 and the storage controller 210 is fixed, a ratio between the number of parity bits and the number of data within the fixed code-word size may be adjusted.

In a case where the reliability request type information included in the command CMD received from the first virtual machine VM 1 indicates Weak (W) level, the storage controller 210 may perform an ECC operation on the data of the first virtual machine VM 1 using a first ECC code rate. The first ECC code rate may be, for example, that the parity generator 511 of the ECC engine 217 generates parity bits ECCP[0:3]. In this case, the data may occupy an area other than the parity bits ECCP[0:3] in the fixed code-word size.

In a case where the reliability request type information included in the command CMD received from the first virtual machine VM 1 indicates Medium (M) level, the storage controller 210 may perform an ECC operation on the data of the first virtual machine VM 1 using a second ECC code rate. The second ECC code rate may be, for example, that the parity generator 511 of the ECC engine 217 generates parity bits (ECCP[0:5]). In this case, the data may occupy an area other than the parity bits ECCP[0:5] in the fixed code-word size.

In a case where the reliability request type information included in the command CMD received from the first virtual machine VM 1 indicates Strong (S) level reliability, the storage controller 210 may perform an ECC operation on the data of the first virtual machine VM 1 using a third ECC code rate. The third ECC code rate may be, for example, that the parity generator 511 of the ECC engine 217 generates parity bits (ECCP[0:7]). In this case, the data may occupy an area other than the parity bits ECCP[0:7] in the fixed code-word size.

As another example, in FIG. 12, assuming that a data size exchanged between the first virtual machine VM 1 and the storage controller 210 is fixed, only the number of linked parity bits may be adjusted for the fixed data size. In a case where the reliability request type information included in the command CMD received from the first virtual machine VM 1 indicates Weak (W) level, the storage controller 210 may perform an ECC operation on the data of the first virtual machine VM 1 using a first ECC code rate. The first ECC code rate may be, for example, that the parity generator 511 of the ECC engine 217 generates parity bits ECCP[0:3]. In this case, the data has a fixed size, and the parity bits ECCP[0:3] may be linked with the data.

In a case where the reliability request type information included in the command CMD received from the first virtual machine VM 1 indicates Medium (M) level reliability, the storage controller 210 may perform an ECC operation on the data of the first virtual machine VM 1 using a second ECC code rate. The second ECC code rate may be, for example, that the parity generator 511 of the ECC engine 217 generates parity bits ECCP[0:5]. In this case, the data has a fixed size, and the parity bits ECCP[0:5] may be linked with the data.

In a case where the reliability request type information included in the command CMD received from the first virtual machine VM 1 indicates Strong (S) level reliability, the storage controller 210 may perform an ECC operation on the data of the first virtual machine VM 1 using a third ECC code rate. The third ECC code rate may be, for example, that the parity generator 511 of the ECC engine 217 generates parity bits ECCP[0:7]. In this case, the data has a fixed size, and the parity bits ECCP[0:7] may be linked with the data.

Figure 13:
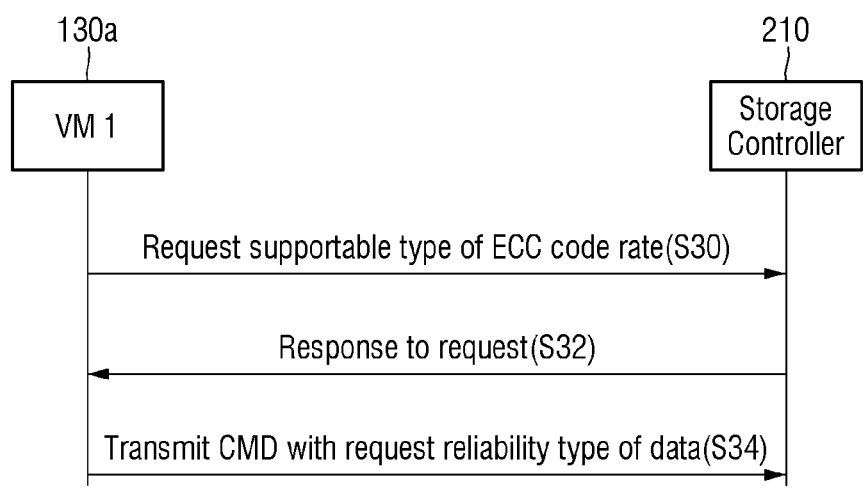
FIG. 13 is a ladder diagram illustrating an operating method of a storage system according to some exemplary embodiments.

FIG. 13 is a ladder diagram illustrating an operating method of a storage system according to some exemplary embodiments. FIGS. 1, 9, 10, and 13 illustrate an example of a protocol through transmission/reception of packets between the first virtual machine VM 1 of the host 100 and the storage controller 210. In more detail, packets between the first virtual machine VM 1 of the host 100 and the storage controller 210 may be managed through the packet manager 215.

The first virtual machine VM 1 may request ECC cord rate information supportable by the storage device 200 from the storage controller 210 (S30). In more detail, the first virtual machine VM 1 may request information on the number of parity bits that the ECC engine 217 of the storage device 200 may generate through the parity generator 511.

In response to such a request, the storage controller 210 transmits the ECC cord rate information supportable by the storage device 200 to the first virtual machine VM 1 (S32). In more detail, the storage controller 210 may transmit the information on the number of parity bits that the ECC engine 217 of the storage device 200 may generate through the parity generator 511, as a response. For example, the storage controller 210 may transmit information indicating that the parity generator 511 of the ECC engine 217 may generate the parity bits ECCP[0:7], the parity bits ECCP[0:5], or the parity bits ECCP[0:3], as the response. This is an example, and the number of parity bits that the parity generator 511 of the ECC engine 217 may generate may be various.

The first virtual machine VM 1 determines a reliability request type according to a reliability request type required for the data of the first virtual machine VM 1 based on the response received from the storage controller 210, includes the determined reliability request type in the command CMD, and transmits the command CMD with the reliability request type to the storage controller 210 (S34).

Figure 14:
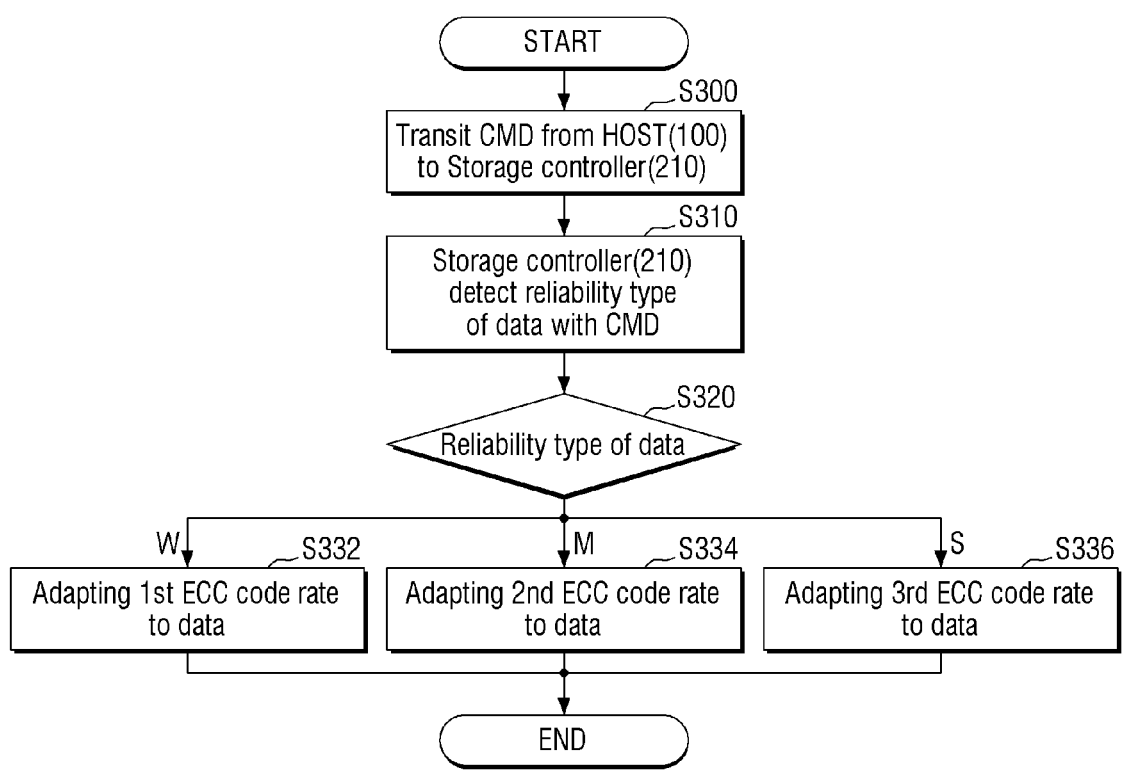
FIG. 14 is a flowchart illustrating another operating method of a storage device according to some exemplary embodiments.

FIG. 14 is a flowchart illustrating another operating method of a storage device according to some exemplary embodiments. Referring to FIGS. 1, 9, 10, and 14 the command CMD generated by the first virtual machine VM 1 is transmitted from the host 100 to the storage controller 210 (S300). In this case, the command CMD generated by the first virtual machine VM 1 may include reliability request type information required for the data of the first virtual machine VM 1.

The storage controller 210 detects reliability request type information of the data indicating which level of reliability the first virtual machine VM 1 requests for the data of the first virtual machine VM 1, through the received command CMD (S310). Then, the storage controller 210 determines whether the first virtual machine VM 1 desires weak reliability (W: Weak), desires medium reliability (M: Medium), or desires strong reliability (S: Strong), for the data of the first virtual machine VM 1, based on the reliability request type information included in the command CMD (S320). In this case, the number of reliability request types divided by the first virtual machine VM 1 is not limited thereto. For example, the reliability may also be divided into five types such as weak reliability, slightly weak reliability, medium reliability, slightly strong reliability, and strong reliability. The reliability may be divided through the number of parity bits that may be generated by the parity generator 511 of the ECC engine 217, and thus, is not limited to those in FIG. 14 and a description of FIG. 14.

In a case where the reliability request type information included in the command CMD received from the first virtual machine VM 1 indicates Weak (W) level, the storage controller 210 may perform an ECC operation on the data of the first virtual machine VM 1 using a first ECC code rate (S332). The first ECC code rate may be, for example, that the parity generator 511 of the ECC engine 217 generates parity bits ECCP[0:3].

In a case where the reliability request type information included in the command CMD received from the first virtual machine VM 1 indicates Medium (M), the storage controller 210 may perform an ECC operation on the data of the first virtual machine VM 1 using a second ECC code rate (S334). The second ECC code rate may be, for example, that the parity generator 511 of the ECC engine 217 generates parity bits ECCP[0:5].

In a case where the reliability request type information included in the command CMD received from the first virtual machine VM 1 indicates Strong (S) level reliability, the storage controller 210 may perform an ECC operation on the data of the first virtual machine VM 1 using a third ECC code rate (S336). The third ECC code rate may be, for example, that the parity generator 511 of the ECC engine 217 generates parity bits ECCP[0:7].

It has been described above by way of example that different ECC code rates are applied in different cases to all data of the first virtual machine VM 1, but different reliability request type information may be written into each of the plurality of data of the first virtual machine VM 1, such that different ECC code rates may be applied to each of the plurality of data of the first virtual machine VM 1.

Figure 15:
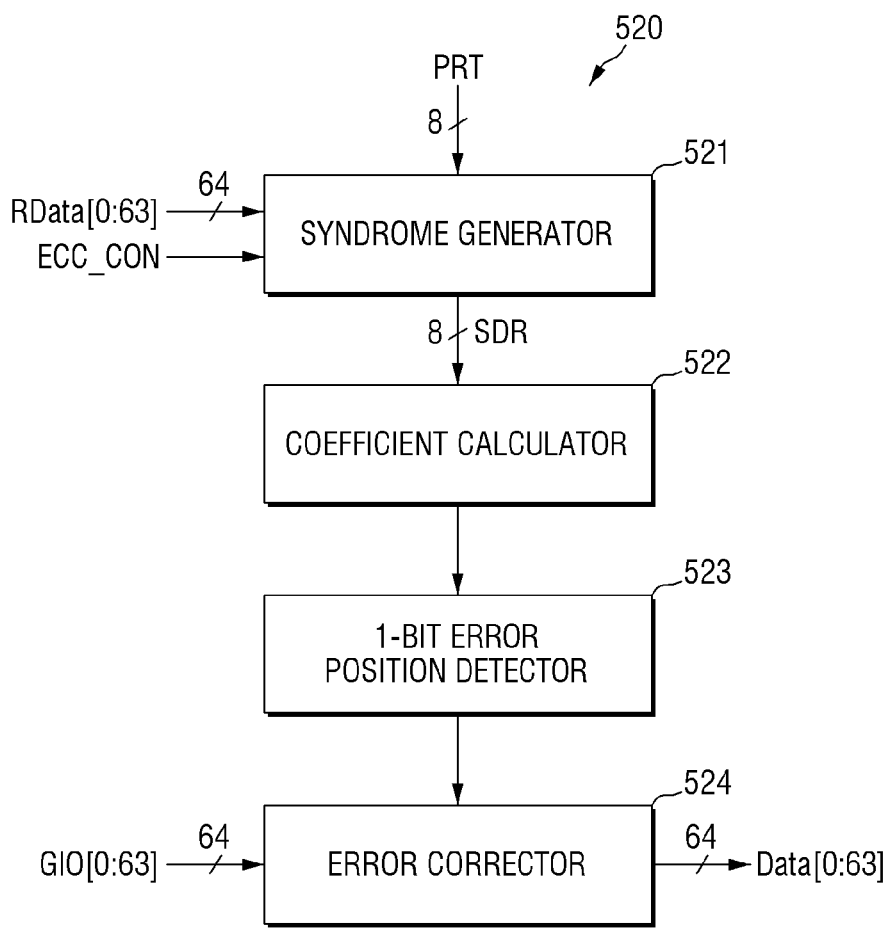
FIG. 15 is a block diagram for describing an ECC decoding circuit of FIG. 9.

FIG. 15 is a block diagram for describing an ECC decoding circuit 520 of FIG. 9. Referring to FIG. 15, the ECC decoding circuit 520 includes a syndrome generator 521, a coefficient calculator 522, a 1-bit error position detector 523, and an error corrector 524. The syndrome generator 521 may receive 64-bit read data and 8-bit parity bits ECCP[0:7] in response to the ECC control signal ECC_CON, and generate syndrome data S[0:7] using an XOR array operation. The coefficient calculator 522 may calculate a coefficient of an error position equation using the syndrome data S[0:7]. The error position equation is an equation having the reciprocal of an error bit as a solution. The 1-bit error position detector 523 may calculate a position of a 1-bit error using the error position equation of which the coefficient is calculated. The error corrector 524 may determine a 1-bit error position based on a detection result of the 1-bit error position detector 523. The error corrector 524 may invert a logic value of a bit in which an error has occurred among the 64-bit read data RData[0:63] according to determined 1-bit error position information to correct the error, and output the 64-bit data Data[0:63] of which the error is corrected.

The syndrome generator 521 may generate a syndrome using, for example, a low density parity check code (LDPC). The present disclosure is not limited thereto, and the syndrome generator 521 may generate a syndrome using, for example, at least one of Bose-Chaudhuri-Hocquenghen (BCH), Reed-Solomon (RS), and cyclic redundancy check (CRC) codes.

Figure 16:
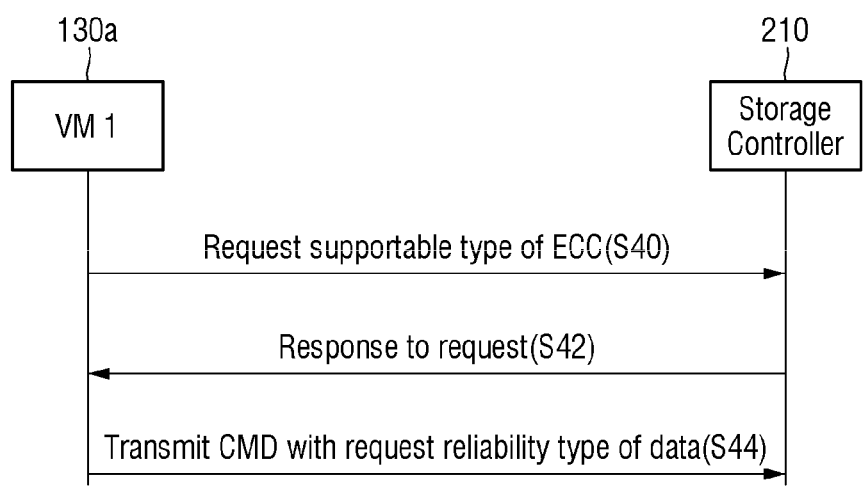
FIG. 16 is a ladder diagram illustrating an operating method of a storage system according to some exemplary embodiments.

FIG. 16 is a ladder diagram illustrating an operating method of a storage system according to some exemplary embodiments. FIGS. 1, 9, 10, 15, and 16 illustrate an example of a protocol through transmission/reception of packets between the first virtual machine VM 1 of the host 100 and the storage controller 210. In more detail, packets between the first virtual machine VM 1 of the host 100 and the storage controller 210 may be managed through the packet manager 215.

The first virtual machine VM 1 may request ECC operation information supportable by the storage device 200 from the storage controller 210 (S40). For example, the first virtual machine VM 1 may request information on a method in which the ECC engine 217 of the storage device 200 may generate a syndrome through the syndrome generator 521.

In response to such a request, the storage controller 210 transmits the ECC operation information supportable by the storage device 200 to the first virtual machine VM 1 (S42). For example, the storage controller 210 may transmit the information on the method in which the ECC engine 217 of the storage device 200 may generate the syndrome through the syndrome generator 521, as a response. For example, the storage controller 210 may transmit information indicating that the syndrome generator 521 of the ECC engine 217 may generate the syndrome using at least one of a low density parity check code (LDPC) and Bose-Chaudhuri-Hocquenghen (BCH), Reed-Solomon (RS), and cyclic redundancy check (CRC) codes, as the response. This is an example, and any information related to an operation of the ECC engine 217 may be transmitted as a response to information desired by the first virtual machine VM 1.

The first virtual machine VM 1 determines a reliability request type according to a reliability request type required for the data of the first virtual machine VM 1 based on the response received from the storage controller 210, includes the determined reliability request type in the command CMD, and transmits the command CMD with the reliability request type to the storage controller 210 (S44).

Figure 17:
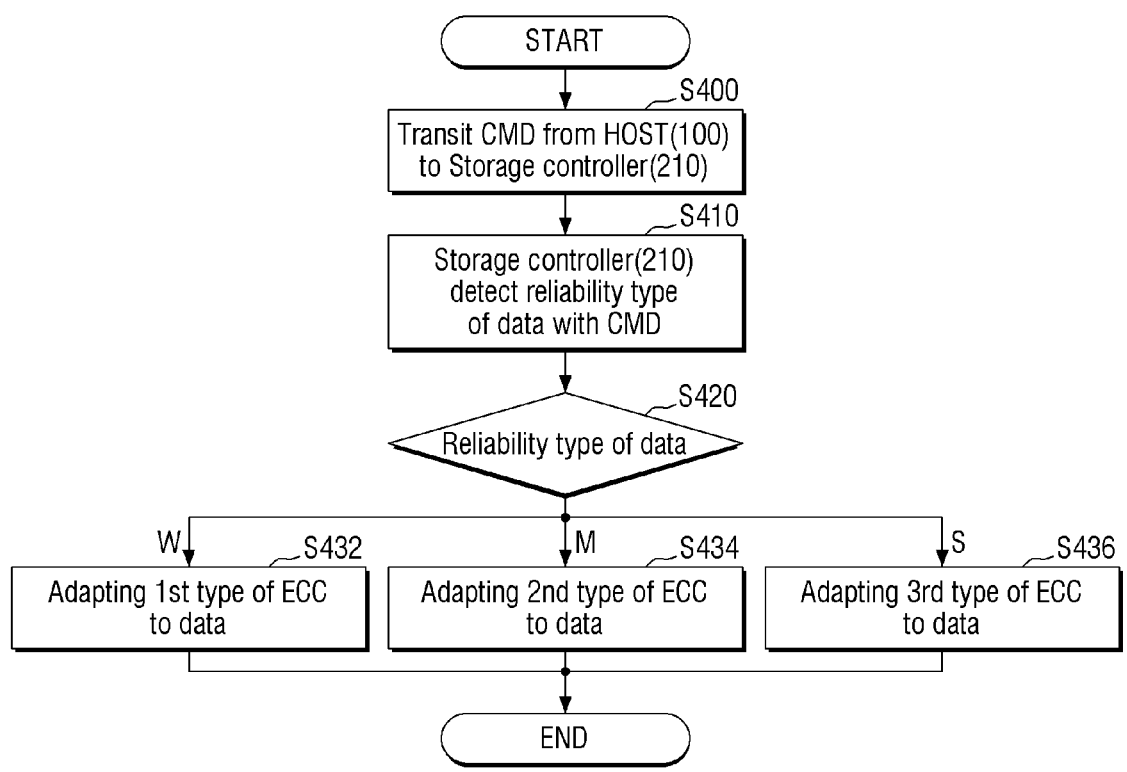
FIG. 17 is a flowchart illustrating another operating method of a storage device according to some exemplary embodiments.

FIG. 17 is a flowchart illustrating another operating method of a storage device according to some exemplary embodiments. Referring to FIGS. 1, 9, 10, 15, and 17, the command CMD generated by the first virtual machine VM 1 is transmitted from the host 100 to the storage controller 210 (S400). In this case, the command CMD generated by the first virtual machine VM 1 may include reliability request type information required for the data of the first virtual machine VM 1.

The storage controller 210 detects reliability request type information of the data indicating which level of reliability the first virtual machine VM 1 requests for the data of the first virtual machine VM 1, through the received command CMD (S410). Then, the storage controller 210 determines whether the first virtual machine VM 1 desires weak reliability (W: Weak), desires medium reliability (M: Medium), or desires strong reliability (S: Strong), for the data of the first virtual machine VM 1, based on the reliability request type information included in the command CMD (S420). In this case, the number of reliability request types divided by the first virtual machine VM 1 is not limited thereto. For example, the reliability may also be divided into five types such as weak reliability, slightly weak reliability, medium reliability, slightly strong reliability, and strong reliability. The reliability may be divided according to various methods in which the ECC engine 217 may operate, and thus, is not limited to those in FIG. 17 and a description of FIG. 17.

In a case where the reliability request type information included in the command CMD received from the first virtual machine VM 1 indicates Weak (W) level reliability, the storage controller 210 may perform an ECC operation on the data of the first virtual machine VM 1 using a first ECC operation type (S432). As an example, the first ECC operation type may be an operation of setting the number of times of iterative decoding of the LDPC to a minimum by the syndrome generator 521 of the ECC engine 217. As another example, the first ECC operation type may be an operation of setting a flow of a defense code to a minimum.

In a case where the reliability request type information included in the command CMD received from the first virtual machine VM 1 indicates Medium (M) level reliability, the storage controller 210 may perform an ECC operation on the data of the first virtual machine VM 1 using a second ECC operation type (S434). As an example, the second ECC operation type may be an operation of setting the number of times of iterative decoding of the LDPC to a medium by the syndrome generator 521 of the ECC engine 217. As another example, the second ECC operation type may be an operation of setting a flow of a defense code to a medium.

In a case where the reliability request type information included in the command CMD received from the first virtual machine VM 1 indicates Strong (S) level reliability, the storage controller 210 may perform an ECC operation on the data of the first virtual machine VM 1 using a third ECC operation type (S436). As an example, the third ECC operation type may be an operation of setting the number of times of iterative decoding of the LDPC to a maximum by the syndrome generator 521 of the ECC engine 217. As another example, the third ECC operation type may be an operation of setting a flow of a defense code to a maximum.

It has been described above by way of example that different ECC operation types are applied in different cases to all data of the first virtual machine VM 1, but different reliability request type information may be written into each of the plurality of data of the first virtual machine VM 1, such that different ECC operation types may be applied to each of the plurality of data of the first virtual machine VM 1.

Figure 18:
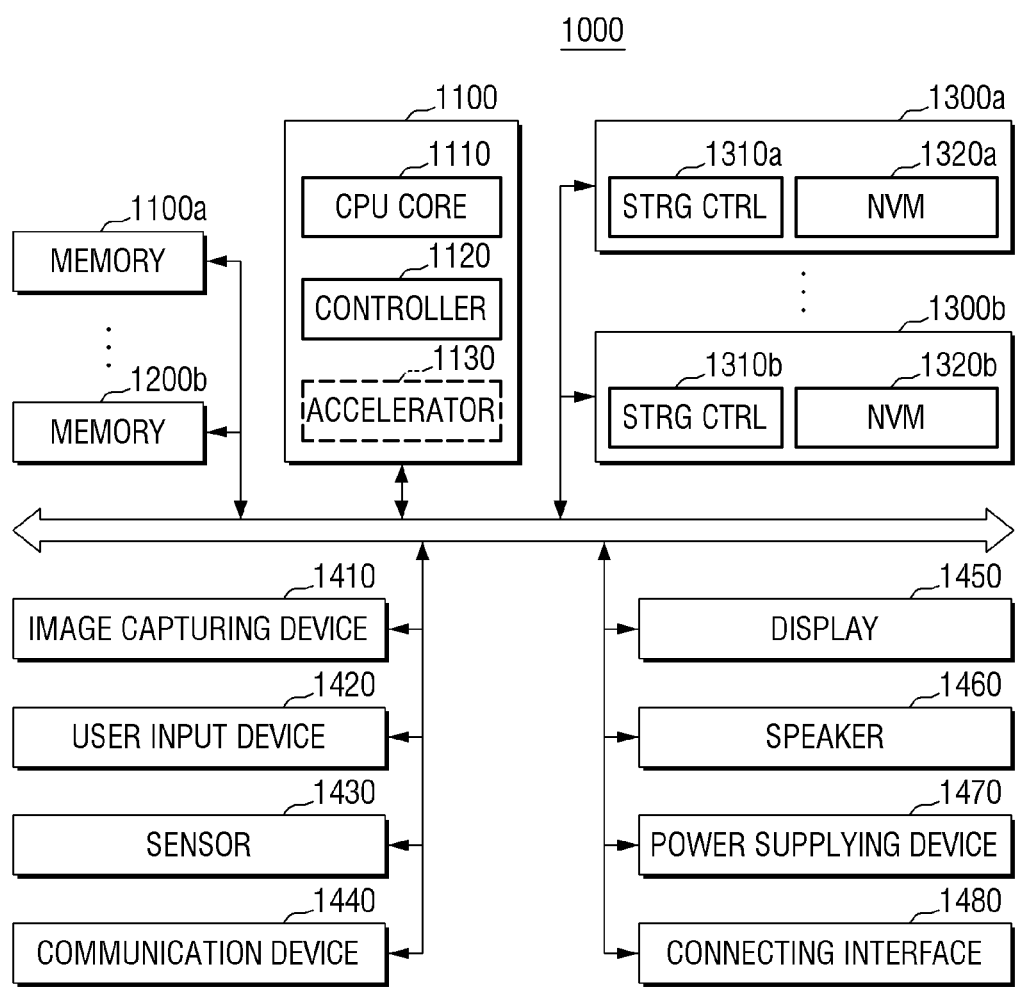
FIGS. 18 and 19 are block diagrams illustrating a storage system to which a storage device according to some exemplary embodiments is applied.
Figure 19:
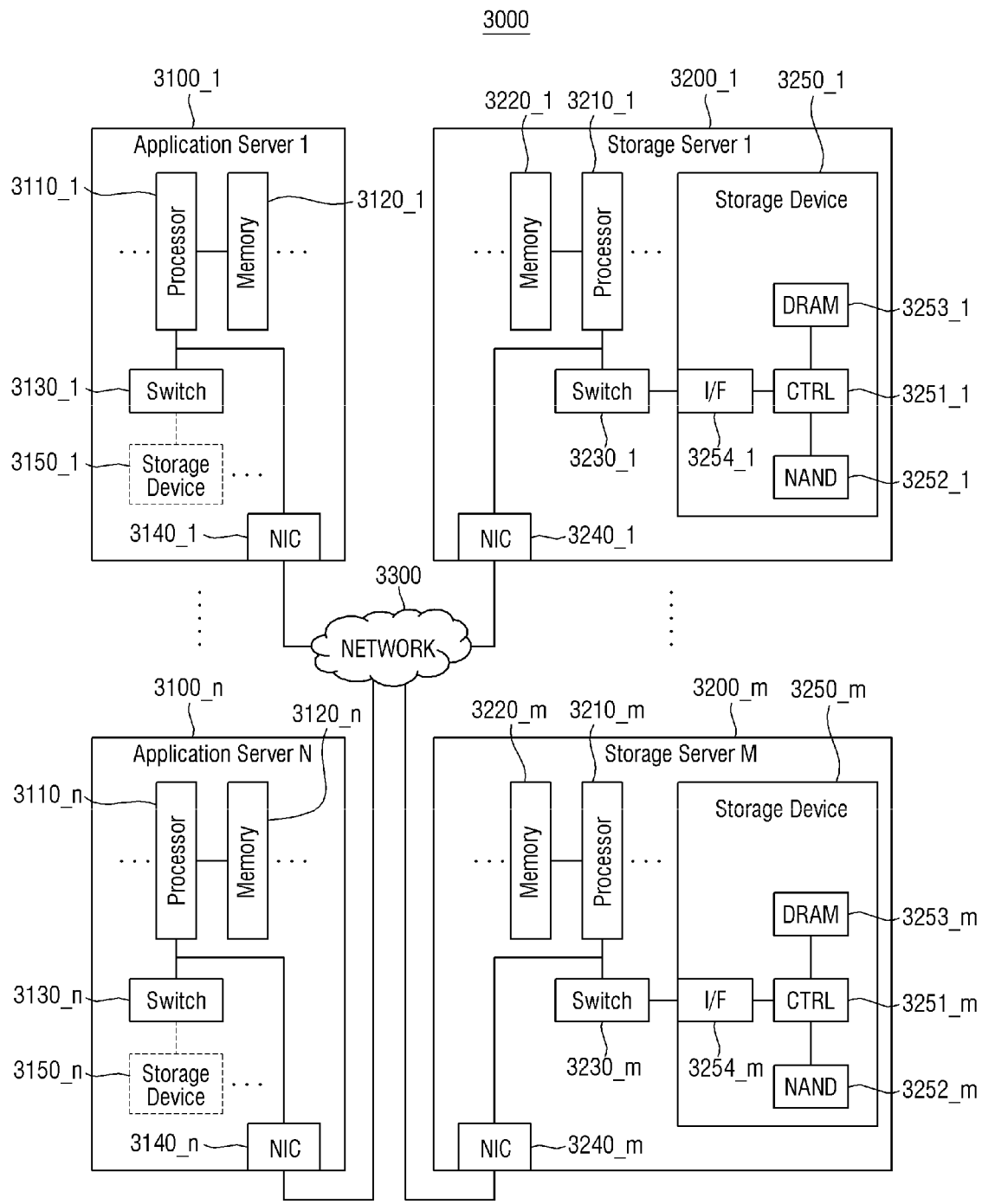

FIGS. 18 and 19 are block diagrams illustrating a storage system to which a storage device according to some exemplary embodiments is applied. A system 1000 of FIG. 18 may be basically a mobile system such as a mobile phone, a smartphone, a tablet personal computer (PC), a wearable device, a healthcare device, or an Internet of things (IOT) device. However, the system 1000 of FIG. 18 is not necessarily limited to the mobile system, and may be a personal computer, a laptop computer, a server, a media player, an automotive device such as a navigation device, or the like.

Referring to FIG. 18, the system 1000 may include a main processor 1100, memories 1200a and 1200b, and storage devices 1300a and 1300b, and may further include one or more of an image capturing device 1410, a user input device 1420, a sensor 1430, a communication device 1440, a display 1450, a speaker 1460, a power supplying device 1470, and a connecting interface 1480.

The main processor 1100 may control a general operation of the system 1000, more specifically, operations of the other components constituting the system 1000. The main processor 1100 may be implemented as a general-purpose processor, a dedicated processor, an application processor, or the like.

The main processor 1100 may include one or more CPU cores 1110, and may further include a controller 1120 for controlling the memories 1200a and 1200b and/or the storage devices 1300a and 1300b. According to exemplary embodiments, the main processor 1100 may further include an accelerator 1130, which is a dedicated circuit for high-speed data operation such as artificial intelligence (AI) data operation. Such an accelerator 1130 may include a graphics processing unit (GPU), a neural processing unit (NPU), a data processing unit (DPU), or the like, and may also be implemented as a separate chip physically independent from the other components of the main processor 1100.

The memories 1200a and 1200b may be used as main memory units of the system 1000, and may include volatile memories such as a static random access memory (SRAM) and/or a dynamic random access memory (DRAM), but may also include non-volatile memories such as a flash memory, a phase change random access memory (PRAM), and/or a resistive random access memory (RRAM). The memories 1200a and 1200b may also be implemented in the same package as the main processor 1100.

The storage devices 1300a and 1300b may function as non-volatile storage devices that store data regardless of whether or not power is supplied thereto, and may have a relatively greater storage capacity than the memories 1200a and 1200b. The storage devices 1300a and 1300b may include storage controllers 1310a and 1310b and non-volatile memories (NVMs) 1320a and 1320b that store data under the control of the storage controllers 1310a and 1310b, respectively. The non-volatile memories 1320a and 1320b may include flash memories having a 2-dimensional (2D) structure or a 3-dimensional (3D) vertical negative AND (V-NAND) structure, but may also include other types of non-volatile memories such as a PRAM and/or an RRAM.

The storage devices 1300a and 1300b may be included in the system 1000 in a state in which they are physically separated from the main processor 1100 or may be implemented in the same package as the main processor 1100. In addition, the storage devices 1300a and 1300b may have a form such as a solid state device (SSD) or a memory card to be detachably coupled to the other components of the system 1000 through an interface such as a connecting interface 1480 to be described later. Such storage devices 1300a and 1300b may be devices to which a standard protocol such as universal flash storage (UFS), embedded multi-media card (eMMC), or non-volatile memory express (NVMe) is applied, but are necessarily limited thereto.

The storage devices 1300a and 1300b may include the storage device described above with reference to FIGS. 1 to 17.

The image capturing device 1410 may capture a still image or a moving image, and may be a camera, a camcorder, a webcam, or the like.

The user input device 1420 may receive various types of data input from a user of the system 1000, and may be a touch pad, a keypad, a keyboard, a mouse, a microphone, or the like.

The sensor 1430 may sense various types of physical quantities that may be obtained from the outside of the system 1000 and convert the sensed physical quantities into electrical signals. Such a sensor 1430 may be a temperature sensor, a pressure sensor, an illuminance sensor, a position sensor, an acceleration sensor, a biosensor, a gyroscope sensor, or the like.

The communication device 1440 may transmit and receive signals to and from other devices outside the system 1000 according to various communication protocols. Such a communication device 1440 may be implemented to include an antenna, a transceiver, a modem, and the like.

The display 1450 and the speaker 1460 may function as output devices that output visual information and auditory information to the user of the system 1000, respectively.

The power supplying device 1470 may appropriately convert power supplied from a battery (not illustrated) embedded in the system 1000 and/or an external power source and supply the converted power to respective components of the system 1000.

The connecting interface 1480 may provide a connection between the system 1000 and an external device connected to the system 1000 to be capable of transmitting and receiving data to and from the system 1000. The connecting interface 1480 may be implemented in various interface manners such as an advanced technology attachment (ATA), a serial ATA (SATA), an external SATA (e-SATA), a small computer small interface (SCSI), a serial attached SCSI (SAS), a peripheral component interconnection (PCI), a PCI express (PCIe), an NVM express (NVMe), an institute of electrical and electronic engineers (IEEE) 1394, a universal serial bus (USB), a secure digital (SD) card, a multi-media card (MMC), an embedded multi-media card (eMMC), a universal flash storage (UFS), an embedded UFS (eUFS), and a compact flash (CF) card interface.

Referring to FIG. 19, a data center 3000 is a facility collecting various data and providing services, and may also be referred to as a data storage center. The data center 3000 may be a system for operating a search engine and a database, and may be a computing system used in a business such as a bank or a government institution. The data center 3000 may include application servers 3100_1 to 3100_n and storage servers 3200_1 to 3200_m. The number of application servers 3100_1 to 3100_n and the number of storage servers 3200_1 to 3200_m may be variously selected according to exemplary embodiments, and the number of application servers 3100_1 to 3100_n and the number of storage servers 3200_1 to 3200_m may be different from each other.

The application server 3100 or the storage server 3200 may include at least one of a processor 3110 or 3210 and a memory 3120 or 3220. Describing the storage server 3200 by way of example, the processor 3210 may control a general operation of the storage server 3200, and may access the memory 3220 to execute an instruction and/or data loaded to the memory 3220. The memory 3220 may be a double data rate synchronous DRAM (DDR SDRAM), a high bandwidth memory (HBM), a hybrid memory cube (HMC), a dual in-line memory module (DIMM), an Optane DIMM, and/or a non-volatile DIMM (NVMDIMM). According to exemplary embodiments, the number of processors 3210 and the number of memories 3220 included in the storage server 3200 may be variously selected. In an exemplary embodiment, the processor 3210 and the memory 3220 may provide a processor-memory pair. In an exemplary embodiment, the number of processors 3210 and the number of memories 3220 may be different from each other. The processor 3210 may include a single-core processor or a multi-core processor. The above description of the storage server 3200 may be similarly applied to the application server 3100. According to exemplary embodiments, the application server 3100 may not include a storage device 3150. The storage server 3200 may include one or more storage devices 3250. The number of storage devices 3250 included in the storage server 3200 may be variously selected according to exemplary embodiments.

The storage device 3250 may include the storage device described above with reference to FIGS. 1 to 17.

Exemplary embodiments of the present disclosure have been described hereinabove with reference to the accompanying drawings, but the present disclosure is not limited to the above-described exemplary embodiments, and may be implemented in various different forms, and one of ordinary skill in the art to which the present disclosure pertains may understand that the present disclosure may be implemented in other specific forms without changing the technical spirit or essential features of the present disclosure. Therefore, it is to be understood that the exemplary embodiments described above are illustrative rather than being restrictive in all aspects.

What is claimed is:

1. A storage device, comprising:
a non-volatile memory device configured to store first data used by a first virtual machine of a host and store second data used by a second virtual machine different from the first virtual machine of the host; and
a storage controller configured to:
receive a first command generated by the first virtual machine from the host, the first command including a first information to control the storage controller to retain or erase the first data when access between the first virtual machine and the storage controller at least temporarily interrupted;
receive a second command generated by the second virtual machine from the host, the second command including a second information to control the storage controller to retain or erase the second data when access between the second virtual machine and the storage controller at least temporarily interrupted;
retain the first data when access between the first virtual machine and the storage controller is at least temporarily interrupted; and
erase the second data when access between the second virtual machine and the storage controller is at least temporarily interrupted.

2. The storage device of claim 1, wherein said retain the first data when access between the first virtual machine and the storage controller is at least temporarily interrupted in the absence of any reduction in power supplied to the storage device.

3. The storage device of claim 2, wherein the first command is one of an admin command and a set feature command.

4. The storage device of claim 1, further comprising:
a buffer memory configured to at least temporarily store third data for the first command; and
wherein in the event the storage controller receives a retain command for the third data, the storage controller stores the third data in the non-volatile memory device when access between the first virtual machine and the storage controller is at least temporarily interrupted.

5. The storage device of claim 1, wherein the first command is a non-volatile memory (NVM) command including: (i) a write command for writing the first data to the non-volatile memory device, or (ii) a read command for reading the first data from the non-volatile memory device.

6. A storage system, comprising:
a host including a first virtual machine and a second virtual machine different from the first virtual machine;
a non-volatile memory device configured to store first data used by the first virtual machine and store second data used by the second virtual machine;
a storage controller configured to:
receive a first command generated by the first virtual machine from the host, the first command including first encryption strength information for the first data;
receive a second command generated by the second virtual machine from the host, the second command including second encryption strength information for the second data; and
an encryption/decryption engine configured to perform encryption and decryption operations on the first data and the second data, which include a plurality of cryptography algorithms;
wherein the encryption/decryption engine is configured to:
perform the encryption and decryption operations on the first data using at least one of the plurality of cryptography algorithms and according to the first encryption strength information;
perform the encryption and decryption operations on the second data using at least one of the plurality of cryptography algorithms and according to the second encryption strength information;
wherein the first virtual machine is configured to request cryptography algorithm information supportable by the storage controller from the storage controller;
wherein the storage controller is configured to transmit the supportable cryptography algorithm information to the first virtual machine in response to the request; and
wherein the first virtual machine is configured to generate the first command based on the cryptography algorithm information.

7. The storage system of claim 6, wherein the first command is an admin command.

8. The storage system of claim 7, wherein the first command is a set feature command.

9. The storage system of claim 6, wherein the first command is a non-volatile memory (NVM) command including: (i) a write command for writing the first data to the non-volatile memory device, or (ii) a read command for reading the first data from the non-volatile memory device.

10. The storage system of claim 6, wherein the plurality of cryptography algorithms include at least two of: (i) a Rivest-Shamir-Adleman (RSA) algorithm, (ii) an elliptic curve cryptography (ECC) algorithm, and (iii) a post quantum cryptography (PQC) algorithm.

11. The storage system of claim 10, wherein the encryption/decryption engine is configured to perform the encryption and decryption operations on the first data using the RSA when the first encryption strength information indicates a relatively weak strength.

12. The storage system of claim 11, wherein the encryption/decryption engine is configured to perform the encryption and decryption operations on the first data using the ECC when the first encryption strength information indicates a relatively medium strength.

13. The storage system of claim 12, wherein the encryption/decryption engine is configured to perform the encryption and decryption operations on the first data using the PQC when the first encryption strength information indicates a relatively strong strength.

14. The storage system of claim 6,
wherein the first command includes third encryption strength information for third data different from the first data and associated with the first command; and
wherein the encryption/decryption engine is configured to perform encryption and decryption operations on the third data using at least one of the plurality of cryptography algorithms according to the third encryption strength information.

15. A storage device, comprising:
a non-volatile memory device configured to store first data used by a first virtual machine of a host and store second data used by a second virtual machine different from the first virtual machine of the host; and
a storage controller configured to:
receive a first command generated by the first virtual machine from the host, the first command including first reliability request type information for the first data;
receive a second command generated by the second virtual machine from the host, the second command including second reliability request type information for the second data; and
an ECC engine configured to perform an error detection and correction function for the first data and the second data;
wherein the ECC engine is configured to:
determine a first operation method of the ECC engine for the first data according to the first reliability request type information; and
determine a second operation method of the ECC engine for the second data according to the second reliability request type information.

16. The storage device of claim 15, wherein the ECC engine is configured to determine the number of parity bits generated for the first data according to the first reliability request type information.

17. The storage device of claim 16,
wherein the first command includes third reliability request type information for third data that is different from the first data and is associated with the first command; and
wherein the ECC engine is configured to determine a third operation method of the ECC engine for the third data according to the third reliability request type information.

18. The storage device of claim 15, wherein the ECC engine includes an ECC encoding circuit and an ECC decoding circuit; wherein the ECC decoding circuit includes a syndrome generator configured to generate a syndrome for the first data; and wherein the syndrome generator is configured to generate the syndrome using a low density parity check code (LDPC) according to the first reliability request type information.

19. The storage device of claim 15, wherein the ECC is configured to perform an error correction code operation on the first data using a first error correction code rate when the first reliability request type information indicates weak level reliability, and using a second error correction code rate when the second reliability request type information indicates strong level reliability.

* * * * *